US012371265B2

(12) United States Patent
Stutz et al.

(10) Patent No.: US 12,371,265 B2
(45) Date of Patent: Jul. 29, 2025

(54) METHODS, APPARATUSES AND COMPUTER PROGRAM PRODUCTS FOR PROVIDING DYNAMIC CONTROL IN AUTOMATED STORAGE AND RETRIEVAL SYSTEMS

(71) Applicant: INTELLIGRATED HEADQUARTERS, LLC, Mason, OH (US)

(72) Inventors: Adam Stutz, Xenia, OH (US); Anthony J. Turco, Liberty Township, OH (US); Jarl Nicholas Sebastian, Liberty Township, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 961 days.

(21) Appl. No.: 17/450,668

(22) Filed: Oct. 12, 2021

(65) Prior Publication Data
US 2023/0113731 A1 Apr. 13, 2023

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0414* (2013.01); *B65G 1/065* (2013.01);
(Continued)

(58) Field of Classification Search
CPC ............ B65G 43/08; B65G 2203/0241; B65G 2811/095; B65G 1/1373; B65G 1/0414;
(Continued)

(56) References Cited

U.S. PATENT DOCUMENTS 9,199,799 B2 * 12/2015 Neiser ................. B65G 47/681
9,336,510 B2 * 5/2016 Dearing ................. G06Q 50/60
(Continued)

FOREIGN PATENT DOCUMENTS

CN 102918469 A * 2/2013 ............. G05B 13/04
CN 107416400 B 3/2018
(Continued)

OTHER PUBLICATIONS

European search report Mailed on Feb. 9, 2023 for EP Application No. 22196408.

*Primary Examiner* — Thomas Randazzo
(74) *Attorney, Agent, or Firm* — Alston & Bird LLP

(57) ABSTRACT

Apparatuses, systems, and methods for providing dynamic control in an automated storage and retrieval system (ASRS) are provided. For example, an example method may include retrieving throughput data associated with an ASRS, wherein the throughput data comprises at least one of an expected throughput rate or an actual throughput rate associated with the ASRS; retrieving at least one throughput range associated with the ASRS, wherein each of the at least one throughput range comprises an upper throughput limit associated with the ASRS and a lower throughput limit associated with the ASRS; and adjusting at least one speed setting of at least one article transport device of the ASRS based at least in part on the throughput data and the at least one throughput range.

19 Claims, 23 Drawing Sheets

(51) Int. Cl.
  *B65G 1/06*        (2006.01)
  *B65G 43/08*       (2006.01)
(52) U.S. Cl.
  CPC ...... *B65G 43/08* (2013.01); *B65G 2203/0241* (2013.01); *B65G 2811/095* (2013.01)
(58) Field of Classification Search
  CPC ............. B65G 1/065; G06Q 10/06313; G06Q 10/087; G06Q 10/08
  See application file for complete search history.

(56) References Cited

U.S. PATENT DOCUMENTS

| | | | |
|---|---|---|---|
| 10,144,593 B2* | 12/2018 | Neiser | B65G 43/08 |
| 10,800,617 B2* | 10/2020 | Ueda | B65G 61/00 |
| 2006/0049250 A1* | 3/2006 | Sullivan | G06K 19/0701 |
| | | | 700/215 |
| 2017/0283185 A1 | 10/2017 | Gorski | |
| 2017/0334658 A1 | 11/2017 | Neiser et al. | |
| 2017/0362036 A1 | 12/2017 | Hartmann et al. | |
| 2019/0193945 A1 | 6/2019 | Schroader | |
| 2019/0233213 A1 | 8/2019 | Phan et al. | |
| 2020/0324974 A1 | 10/2020 | Gorman | |

FOREIGN PATENT DOCUMENTS

| | | |
|---|---|---|
| WO | 2019/094511 A1 | 5/2019 |
| WO | 2020/210001 A1 | 10/2020 |

* cited by examiner

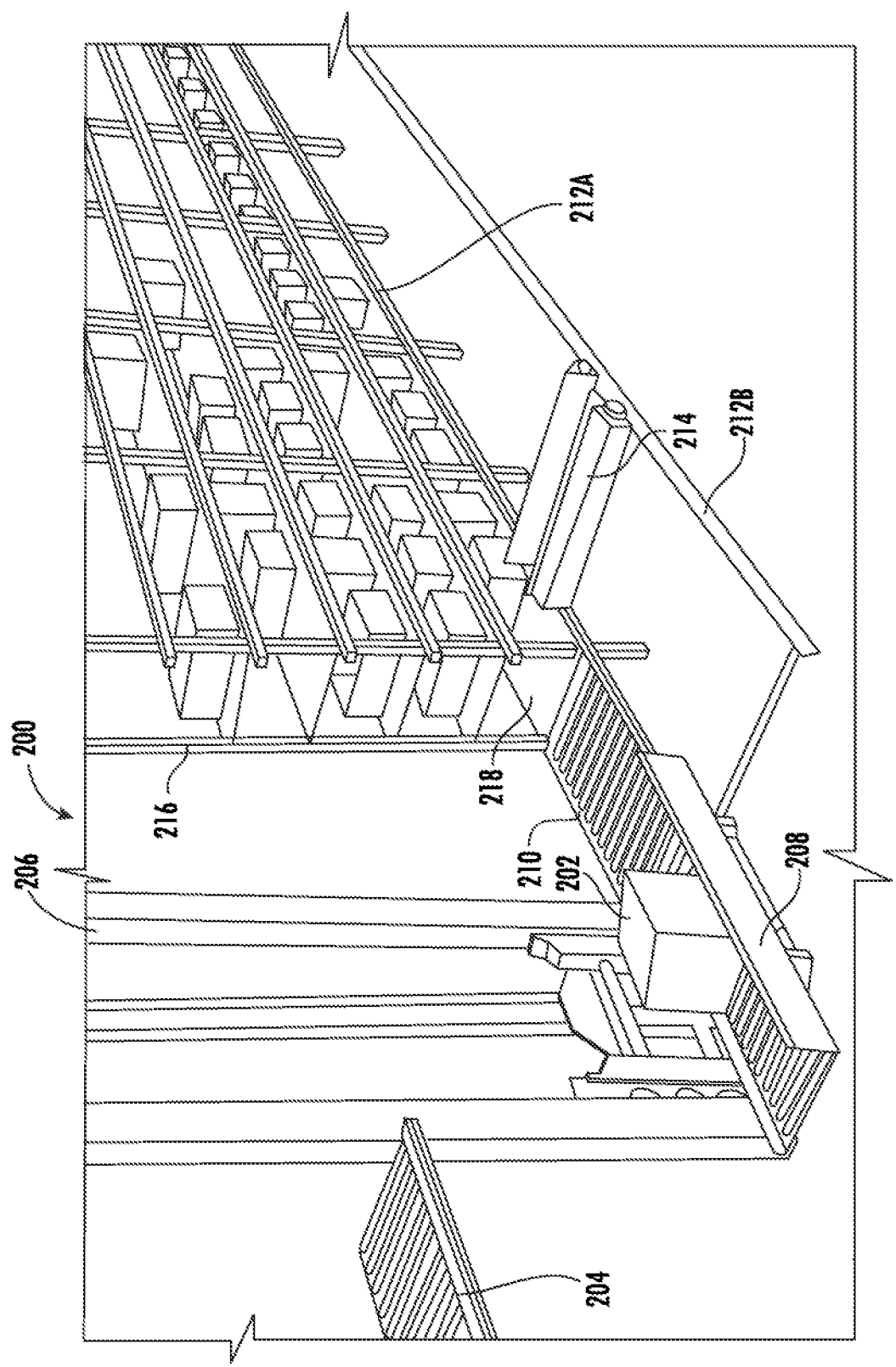

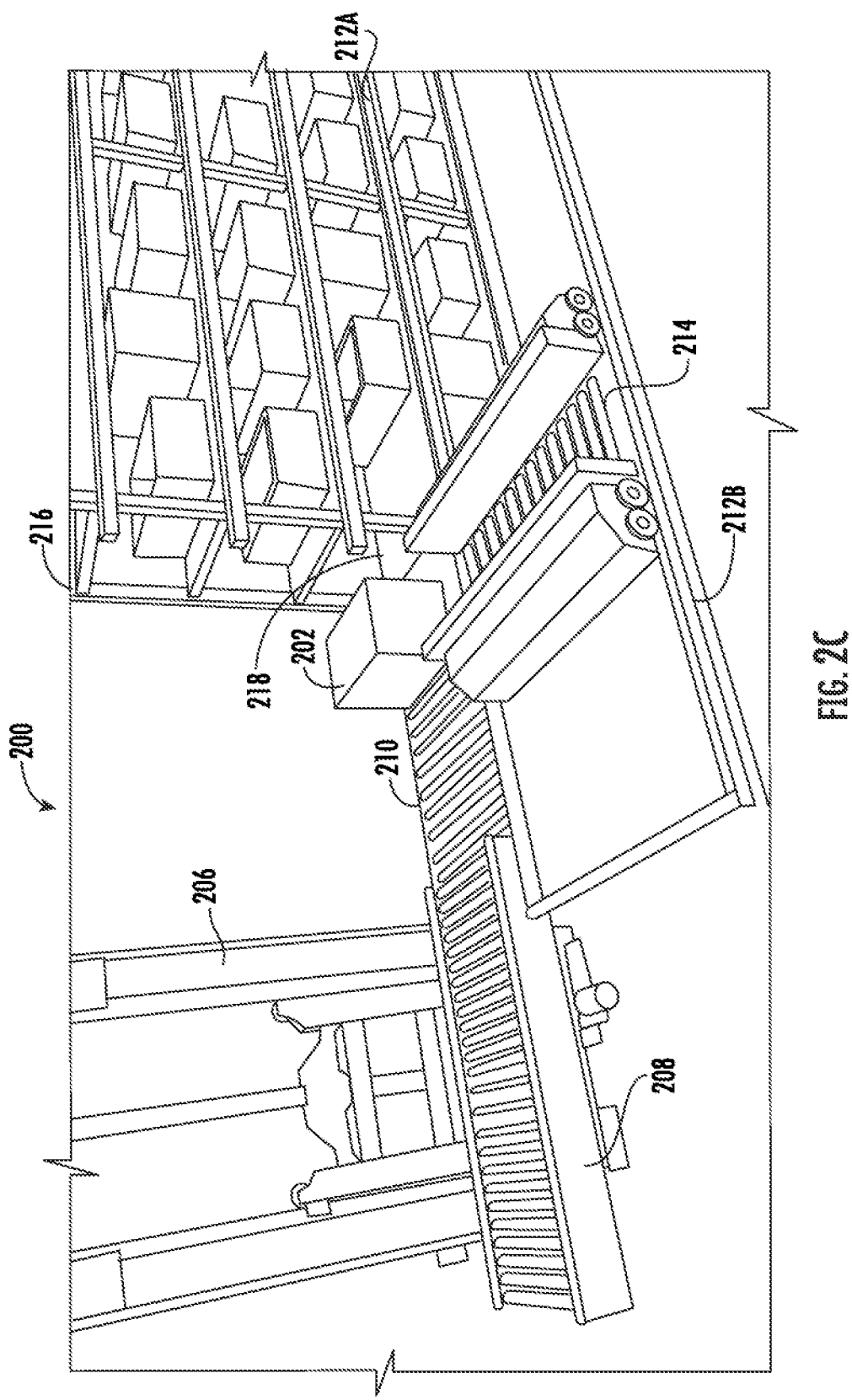

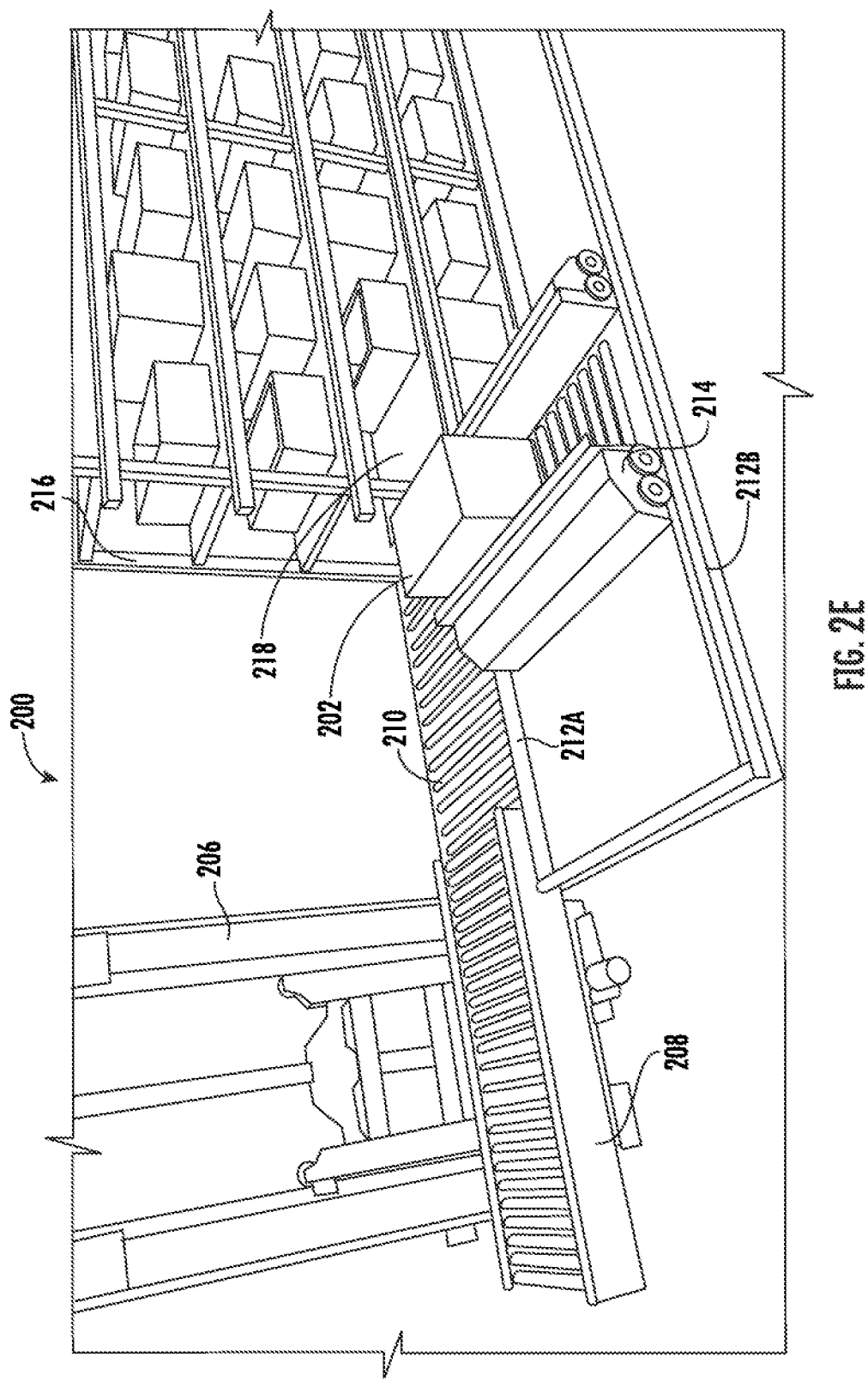

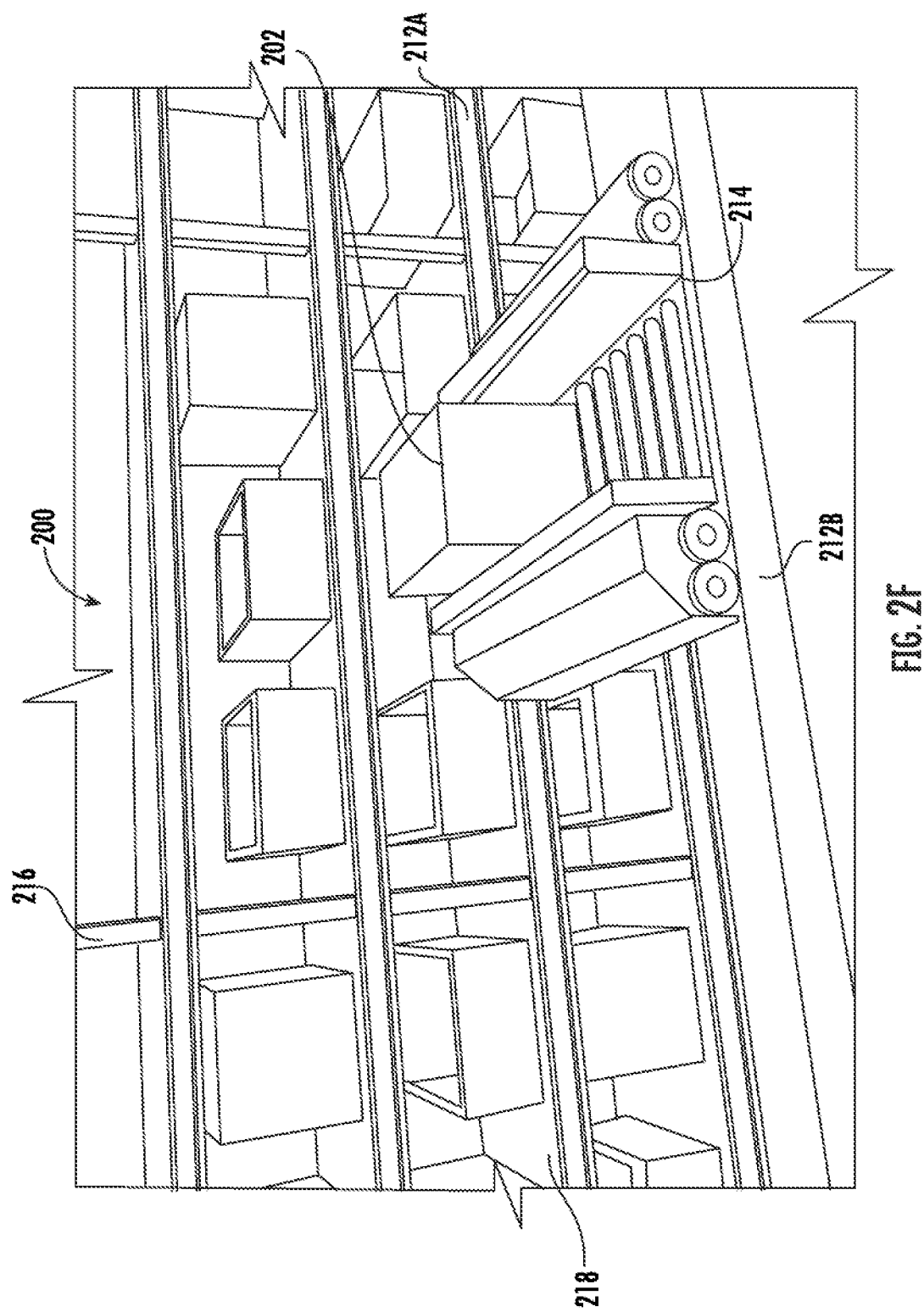

METHODS, APPARATUSES AND COMPUTER PROGRAM PRODUCTS FOR PROVIDING DYNAMIC CONTROL IN AUTOMATED STORAGE AND RETRIEVAL SYSTEMS

FIELD OF THE INVENTION

Example embodiments of the present disclosure relate generally to material handling systems and, more particularly, to systems and apparatuses for improved control in an automated storage and retrieval system (ASRS).

BACKGROUND

Applicant has identified many technical challenges and difficulties associated with warehouses, distribution centers, and other material handling environments. For example, they often rely on a number of devices to transport items to and from various locations; however, such devices may often encounter reliability issues and can be cost-prohibitive to operate and maintain.

BRIEF SUMMARY

Various embodiments described herein relate to methods, apparatuses, and systems for improving an automated storage and retrieval system (ASRS). In particular, various embodiments are related to controlling the operation speed associated with article transport devices in an ASRS.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: retrieve throughput data associated with an ASRS, wherein the throughput data comprises at least one of an expected throughput rate or an actual throughput rate associated with the ASRS; retrieve at least one throughput range associated with the ASRS, wherein each of the at least one throughput range comprises an upper throughput limit associated with the ASRS and a lower throughput limit associated with the ASRS; and adjust at least one speed setting of at least one article transport device of the ASRS based at least in part on the throughput data and the at least one throughput range.

In some embodiments, the at least one non-transitory memory and the program code are configured to, with the at least one processor, cause the apparatus to: in response to determining that the expected throughput rate or the actual throughput rate exceeds the upper throughput limit, increase the at least one speed setting of the at least one article transport device of the ASRS.

In some embodiments, the at least one non-transitory memory and the program code are configured to, with the at least one processor, cause the apparatus to: in response to determining that the expected throughput rate or the actual throughput rate is below the lower throughput limit, decrease the at least one speed setting of the at least one article transport device of the ASRS.

In some embodiments, the at least one non-transitory memory and the program code are configured to, with the at least one processor, cause the apparatus to: retrieve a plurality of throughput ranges associated with the ASRS, wherein each of the plurality of throughput ranges is associated with a predetermined speed setting associated with the at least one article transport device of the ASRS; determine a first throughput range from the plurality of throughput ranges, wherein the expected throughput rate or the actual throughput rate is within the first throughput range; determine a first predetermined speed setting corresponding to the first throughput range; and adjust the at least one speed setting of the at least one article transport device based at least in part on the first predetermined speed setting.

In some embodiments, the throughput data comprises the actual throughput rate. In some embodiments, the actual throughput rate indicates at least one of an actual article inbound rate associated with the ASRS or an actual article outbound rate associated with the ASRS.

In some embodiments, the throughput data comprises the expected throughput rate. In some embodiments, the expected throughput rate indicates at least one of an expected article inbound rate associated with the ASRS or an expected article outbound rate associated with the ASRS.

In some embodiments, the at least one non-transitory memory and the program code are configured to, with the at least one processor, cause the apparatus to: retrieve, from a warehouse execution system (WES), inventory tracking data and order fulfillment data; and determine, based at least in part on the inventory tracking data and order fulfillment data, the expected throughput rate associated with the ASRS.

In some embodiments, the ASRS comprises a plurality of storage racks. In some embodiments, each of the plurality of storage racks comprises a plurality of storage levels for storing a plurality of articles.

In some embodiments, the at least one article transport device of the ASRS comprises at least one of a vertical transport device, a motor driven roller (MDR) device, and a horizontal transport device.

In some embodiments, the vertical transport device is associated with a first storage level and a second storage level from the plurality of storage levels. In some embodiments, the first storage level and the second storage level are associated with a first storage rack of the plurality of storage racks.

In some embodiments, the at least one non-transitory memory and the program code are configured to, with the at least one processor, cause the apparatus to: determine a first level-specific expected throughput rate associated with the first storage level of the first storage rack; determine a second level-specific expected throughput rate associated with the second storage level of the first storage rack; calculate a first device-specific expected throughput rate associated with the vertical transport device based at least in part on the first level-specific expected throughput rate and the second level-specific expected throughput rate; retrieve a first device-specific throughput range associated with the vertical transport device; and adjust a first device-specific speed setting of the vertical transport device based at least in part on the first device-specific expected throughput rate and the first device-specific throughput range.

In some embodiments, the MDR device is associated with a first storage level from the plurality of storage levels and is associated with a first storage rack of the plurality of storage racks.

In some embodiments, the at least one non-transitory memory and the program code are configured to, with the at least one processor, cause the apparatus to: determine a first level-specific expected throughput rate associated with the first storage level of the first storage rack; calculate a first device-specific expected throughput rate associated with the MDR device based at least in part on the first level-specific expected throughput rate; retrieve a first device-specific throughput range associated with the MDR device; and adjust a first device-specific speed setting of the MDR device based at least in part on the first device-specific expected throughput rate and the first device-specific throughput range.

In some embodiments, the horizontal transport device is associated with a first storage level of a first storage rack and a second storage level of a second storage rack.

In some embodiments, the at least one non-transitory memory and the program code are configured to, with the at least one processor, cause the apparatus to: determine a first level-specific expected throughput rate associated with the first storage level of the first storage rack; determine a second level-specific expected throughput rate associated with the second storage level of the second storage rack; calculate a first device-specific expected throughput rate associated with the horizontal transport device based at least in part on the first level-specific expected throughput rate and the second level-specific expected throughput rate; retrieve a first device-specific throughput range associated with the horizontal transport device; and adjust a first device-specific speed setting of the horizontal transport device based at least in part on the first device-specific expected throughput rate and the first device-specific throughput range.

In accordance with various embodiments of the present disclosure, a computer-implemented method is provided. The computer-implemented method comprises: retrieving throughput data associated with an ASRS, wherein the throughput data comprises at least one of an expected throughput rate or an actual throughput rate associated with the ASRS; retrieving at least one throughput range associated with the ASRS, wherein each of the at least one throughput range comprises an upper throughput limit associated with the ASRS and a lower throughput limit associated with the ASRS; and adjusting at least one speed setting of at least one article transport device of the ASRS based at least in part on the throughput data and the at least one throughput range.

In accordance with various embodiments of the present disclosure, a computer program product is provided. The computer program product comprises at least one non-transitory computer-readable storage medium having computer-readable program code portions stored therein. In some embodiments, the computer-readable program code portions comprise an executable portion configured to: retrieve throughput data associated with an ASRS, wherein the throughput data comprises at least one of an expected throughput rate or an actual throughput rate associated with the ASRS; retrieve at least one throughput range associated with the ASRS, wherein each of the at least one throughput range comprises an upper throughput limit associated with the ASRS and a lower throughput limit associated with the ASRS; and adjust at least one speed setting of at least one article transport device of the ASRS based at least in part on the throughput data and the at least one throughput range.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 2A, FIG. 2B, FIG. 2C, FIG. 2D, FIG. 2E, FIG. 2F, and FIG. 2G illustrate example operations associated with an example ASRS in accordance with some example embodiments described herein;

DETAILED DESCRIPTION OF THE INVENTION

Figure 1:
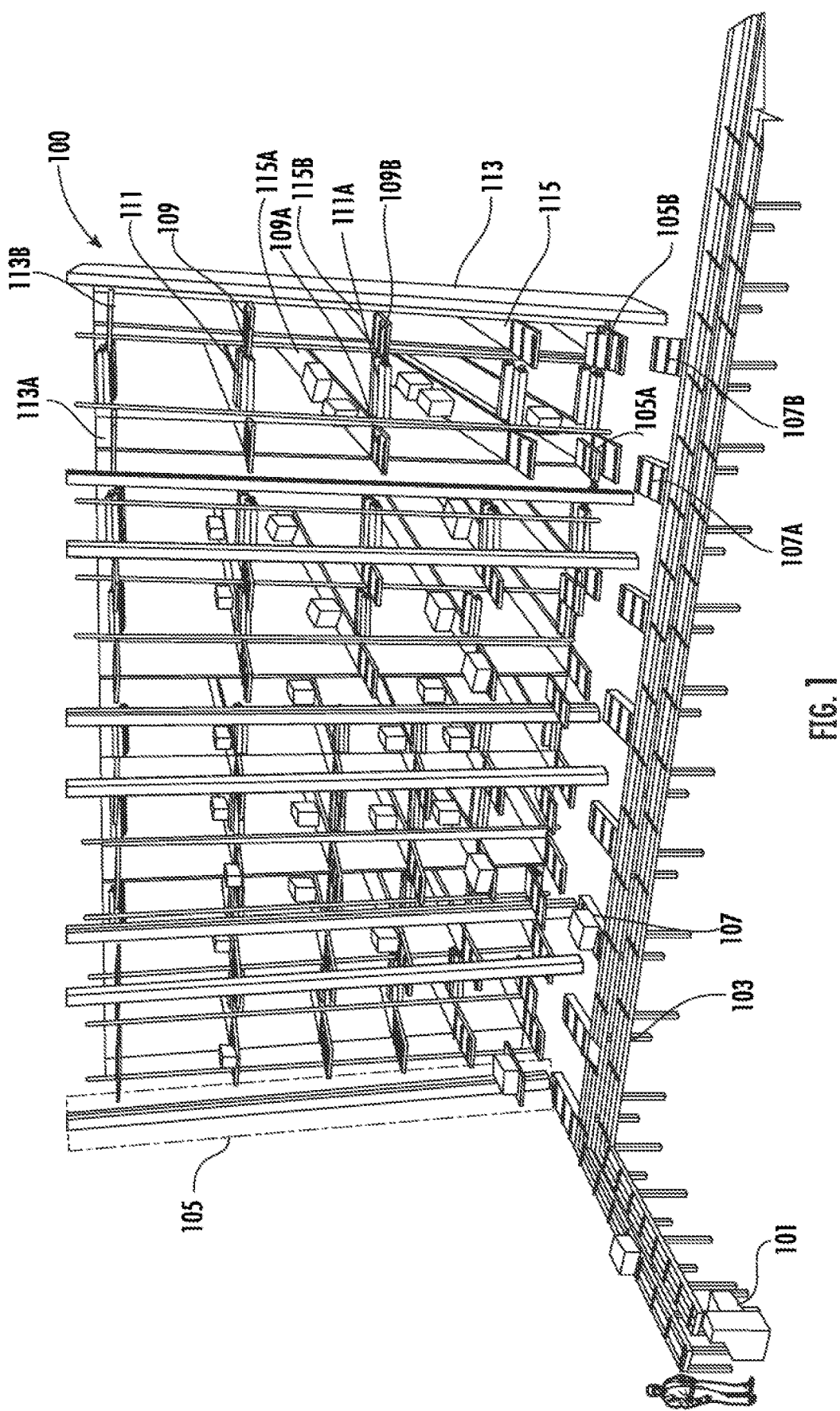
FIG. 1 illustrates at least a portion of an example automated storage and retrieval system (ASRS) in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," "in accordance with various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

In various examples, an ASRS may comprise various article transport devices that can succumb to wear and tear over time. Such article transport devices include, but not limited to, motor driven roller (MDR) devices, vertical transport devices (such as, but not limited to, lifts), and/or horizontal transport devices (such as, but not limited to, shuttles). For example, many systems only run these article transport devices at one speed (such as the maximum speed) regardless of required throughput, which can add additional noise and wear-and-tear and decrease general reliability of the system and its components. Additionally, these reliability issues of the article transport devices can cause the ASRS to provide average throughput but at a high cost to purchase, install, operate, and maintain these article transport devices.

Various embodiments of the present disclosure overcome these technical challenges and problems. For example, to solve these technical challenges and problems, an example controller device in accordance with various embodiments of the present disclosure may observe the throughput associated with the ASRS and/or the throughput associated with the article transport devices, may dynamically adjust the speed of the article transport devices in response to an increase or an decrease of the throughput. In some embodiments, the hardware design supports this dynamic speed change on all article transport devices in the ASRS.

In some embodiments, throughput can be measured by the control devices/systems of article transport devices as articles (such as cartons) entering and leaving the ASRS on a per-aisle basis (for example, some systems have eight aisles between storage racks) at the inbound and/or outbound direction to and/or from the storage racks. In some embodiments, throughput can be determined by a warehouse execution system (WES) sending a message to the control devices/systems based on an expected throughput algorithm.

In some embodiments, a predetermined number of different speeds and speed changes can be assigned to a plurality of throughput thresholds. For example, the speed settings of article transport devices may be set at a first predetermined speed when the throughput is between X and Y, the speed settings of article transport devices may be set at a second predetermined speed when the throughput is between Y and Z, etc. In some embodiments, one or both of the control devices/systems of article transport devices and the WES can trigger the speed change as a function of throughput.

As such, various embodiments of the present disclosure provide dynamic control in ASRS by measuring the throughput using an expected throughput algorithm or an actual throughput algorithm, and based on the expected throughput or the actual throughput, controlling speeds of different article transport devices of the ASRS (such as, but not limited to, motor driven roller (MDR) devices, vertical transport devices (such as, but not limited to, lifts), and/or horizontal transport devices (such as, but not limited to, shuttles)).

Various embodiments of the present disclosure not only overcome technical challenges and problems, but also provide various technical benefits and improvements. For example, by dynamically adjusting speeds of article transport devices of ASRS, various embodiments of the present disclosure decrease wear-and-tear of article transport devices, increase system longevity of ASRS, decrease initial/ongoing hardware cost and manpower cost to operate/maintain article transport devices/ASRS, increase system reliability, decrease noise, and provide a more hearing-safe solution to users of the ASRS who are sensitive to noise. In some embodiments, performance of the ASRS is more efficient, and throughput can ultimately increase at a lower cost as a result of dynamically changing speeds of multiple article transport devices as a function of the throughput. As such, various embodiments of the present disclosure provide a solution to small-scale distribution/micro-fulfillment centers that require little to no manpower to manage by significantly decreasing hardware cost and manpower cost to operate and maintain such centers.

In the present disclosure, the term "automated storage and retrieval system" refers to a computer-controlled system that automatically transports, retrieves, and places articles to and/or from storage locations, such as, but not limited to, storage racks and storage levels associated with storage racks.

In the present disclosure, the term "storage rack" refers to a physical structure that comprises one or more storage levels for storing articles. For example, a storage rack may comprise a frame that secures multiple storage levels. Each storage level comprises a shelf that provides a flat, horizontal plane for storing articles.

In the present disclosure, the term "article" refers to objects (such as, but not limited to, cartons, boxes, containers, pallets, and/or the like) that can be transported to and/or from an automated storage and retrieval system and/or can be transported using an article transport device.

In the present disclosure, the term "article transport device" refers to a moveable device that can transport one or more articles to, from, and/or within an ASRS. Examples of article transport devices include, but are not limited to, vertical transport devices, motor driven roller (MDR) devices, horizontal transport devices, and/or the like, details of which are described herein.

In the present disclosure, the term "horizontal transport device" refers to a device that is configured to transport an article horizontally or substantially horizontally. Examples of horizontal transport devices may be in the forms of shuttles that are illustrated and described herein.

In the present disclosure, the term "vertical transport device" refers to a device that is configured to transport an article vertically or substantially vertically. Examples of vertical transport devices may be in the forms of lifts that are illustrated and described herein.

In the present disclosure, an example ASRS may comprise a plurality of conveyors that use belts, wheels, rollers, chains, and/or the like to transport articles. For example, an example ASRS may comprise one or more rack feeding conveyors that transport articles from a common conveyor towards a storage rack, details of which are described herein. Additionally, or alternatively, an example ASRS may comprise one or more level feeding conveyors that transport articles from a vertical transport device towards a horizontal transport device, details of which are described herein. Additionally, or alternatively, an example vertical transport device may comprise one or more conveyors.

In some embodiments, conveyors in an example ASRS may comprise one or more motor driven roller devices. The terms "motor driven roller," "motor driven roller device," "MDR," or "MDR device" refer to a roller device that is part of a conveyor and driven by a motor. For example, the motor may control/adjust the speed setting of the MDR device, and therefore control/adjust the speed at which the conveyor delivers the articles.

In the present disclosure, the terms "warehouse execution system" or "WES" refer to a computer system that controls the operations of an ASRS, such as, but not limited to, controlling operations of article transport devices within the ASRS to transport the articles.

In some embodiments, a WES may control operations of article transport devices based on data such as, but not limited to, inventory tracking data and order fulfillment data.

In the present disclosure, the term "inventory tracking data" refers to data that indicates the actual storage locations of various articles stored in the ASRS (for example, but not limited to, which storage rack and/or which storage level that the article is stored).

In the present disclosure, the term "order fulfillment data" refers to data that indicates one or more articles that to be transported to the ASRS and/or one or more articles to be transported from the ASRS. In some embodiments, the order fulfillment data may indicate destination storage locations of one or more articles to be transported to the ASRS (for example, but not limited to, which storage rack and/or which storage level to store the article). In some embodiments, the order fulfillment data may indicate storage locations of one or more articles to be transported from the ASRS (for example, but not limited to, which storage rack and/or which storage level the article is stored).

In some embodiments, a WES may control the operations of the article transport device based on assignment data that correlates article transport devices with storage racks and/or storage levels. For example, the assignment data may describe which storage level(s) and/or which storage rack(s) that an article transport device should transport articles to and/or from. Examples of assignment data may include, but not limited to, rack feeding conveyor assignment data, vertical transport device assignment data, level feeding conveyor assignment data, horizontal transport device assignment data, MDR device assignment data, and/or the like.

In the present disclosure, the term "vertical transport device assignment data" refers to data indicating which storage rack(s) and/or which storage level(s) that one vertical transport device is configured to convey articles to and/or from.

In the present disclosure, the term "horizontal transport device assignment data" refers to data indicating which storage rack(s) and/or which storage level(s) that one horizontal transport device is configured to convey articles to and/or from.

In the present disclosure, the term "rack feeding conveyor assignment data" refers to data indicating which storage rack(s) that one rack feeding conveyor is configured to convey articles to and/or from.

In the present disclosure, the term "level feeding conveyor assignment data" refers to data indicating which storage rack(s) and/or which storage level(s) that one level feeding conveyor is configured to convey articles to and/or from.

As described above, rack feeding conveyors and/or level feeding conveyors may comprise MDR devices. In the present disclosure, the term "MDR device assignment data" refers to data indicating which storage rack(s) and/or which storage level(s) that one MDR device is configured to convey articles to and/or from.

In the present disclosure, the terms "throughput data" or "throughput rate" refer to data/rate that indicates the actual amount of articles that are transported to, from, and within an ASRS within a time interval and/or the expected amount of articles that are transported to, from, and within an ASRS within the time interval. In some embodiments, the throughput data may be associated with an ASRS and may comprise or indicate an actual throughput rate associated with the ASRS or an expected throughput rate associated with the ASRS.

In the present disclosure, the term "actual throughput rate" refers to a measure of the actual amount of articles that are transported to and/or from one or more storage racks and/or one or more storage levels in the ASRS within a time interval. As an example, the actual throughput rate may indicate the actual amount of articles that are transported to and from a storage rack (for example, to a common conveyor) per minute. As described herein, article transport devices may comprise sensors that can detect the presence of articles. Additionally, or alternatively, article transport devices may comprise controllers that can track the number of articles that an article transport device transports to and from the storage rack within a time interval so as to determine the actual article inbound rate.

In some embodiments, an actual throughput rate may be associated with an actual article inbound rate and an actual article outbound rate.

In the present disclosure, the term "actual article inbound rate" refers to a measure of the actual amount of articles that are transported to one or more storage racks and/or one or more storage levels in the ASRS within a time interval. As an example, the actual article inbound rate may indicate the actual amount of articles that are transported to a storage rack (for example, from a common conveyor) per minute. As described herein, article transport devices may comprise sensors that can detect the presence of articles. Additionally, or alternatively, article transport devices may comprise controllers that can track the number of articles that are transported to the storage rack within a time interval so as to determine the actual article inbound rate.

In the present disclosure, the term "actual article outbound rate" refers to a measure of the actual amount of articles that are transported from one or more storage racks and/or one or more storage levels in the ASRS within a time interval. As an example, the actual article outbound rate may indicate the actual amount of articles that are transported from a storage rack (for example, to a common conveyor) per minute. As described herein, article transport devices may comprise sensors that can detect the presence of articles. Additionally, or alternatively, article transport devices may comprise controllers that can track the number of articles that are transported from the storage rack within a time interval so as to determine the actual article outbound rate.

In the present disclosure, the term "device-specific actual throughput rate" refers to refers to a measure of the actual amount of articles that are transported by a specific article transport device (for example, to and/or from another article transport device, storage level, and/or storage rack) in the ASRS within a time interval. As described herein, article transport devices may comprise sensors that can detect the presence of articles. Additionally, or alternatively, article transport devices may comprise controllers that can track the number of articles that an article transport device transports within a time interval so as to determine the device-specific actual throughput rate.

In the present disclosure, the term "level-specific actual throughput rate" refers to a measure of the actual amount of articles that are transported to and from a specific storage level in the ASRS within a time interval. As described herein, article transport devices may comprise sensors that can detect the presence of articles. Additionally, or alternatively, article transport devices may comprise controllers that can track the number of articles that are transported to and from a specific storage level in the ASRS within a time interval so as to determine the level-specific actual throughput rate.

In the present disclosure, the term "rack-specific actual throughput rate" refers to a measure of the actual amount of articles that are transported to and from a specific storage rack (that comprises multiple storage levels) in the ASRS within a time interval. As described herein, article transport devices may comprise sensors that can detect the presence of articles. Additionally, or alternatively, article transport devices may comprise controllers that can track the number of articles that are transported to and from a specific storage rack in the ASRS within a time interval so as to determine the rack-specific actual throughput rate.

In the present disclosure, the term "expected throughput rate" refers to a measure of the expected amount of articles that are to be transported to and/or from one or more storage racks and/or one or more storage levels in the ASRS within a time interval. As an example, the expected throughput rate may indicate the expected amount of articles that are to be transported to and from a storage rack (for example, to a common conveyor) per minute. As the WES may receive order fulfillment data that indicates one or more articles to be transported to the ASRS and/or one or more articles to be transported from the ASRS, the WES may determine the expected throughput rate based at least in part on the order fulfillment data.

In the present disclosure, the term "expected article inbound rate" refers to a measure of the expected amount of articles that are to be transported to one or more storage racks and/or one or more storage levels in the ASRS within a time interval. As an example, the expected article inbound rate may indicate the expected amount of articles that are to be transported to a storage rack (for example, to a common conveyor) per minute. As the WES may receive order fulfillment data that indicates one or more articles to be transported to the ASRS, the WES may determine the expected article inbound rate based at least in part on the order fulfillment data.

In the present disclosure, the term "expected article outbound rate" refers to a measure of the expected amount of articles that are to be transported from one or more storage racks and/or one or more storage levels in the ASRS within a time interval. As an example, the expected throughput rate may indicate the expected amount of articles that are to be transported from a storage rack (for example, to a common conveyor) per minute. As the WES may receive order fulfillment data that indicates one or more articles to be transported from the ASRS, the WES may determine the expected article outbound rate based at least in part on the order fulfillment data.

In the present disclosure, the term "device-specific expected throughput rate" refers to a measure of the expected amount of articles that are to be transported by a specific article transport device (for example, to and/or from another article transport device, storage level, and/or storage rack) in the ASRS within a time interval. As the WES may receive order fulfillment data that indicates one or more articles that to be transported to the ASRS and/or one or more articles to be transported from the ASRS, the WES may determine the device-specific expected throughput rate based the order fulfillment data and the assignment data associated with the article transport device.

In the present disclosure, the term "level-specific expected throughput rate" refers to a measure of the expected amount of articles that are to be transported to and from a specific storage level in the ASRS within a time interval. As the WES may receive order fulfillment data that indicates the one or more articles that to be transported to the ASRS and/or one or more articles to be transported from the ASRS, the WES may determine the level-specific expected throughput rate based the order fulfillment data and the inventory tracking data.

In the present disclosure, the term "rack-specific expected throughput rate" refers to a measure of the expected amount of articles that are to be transported to and from a specific storage rack (that comprises multiple storage levels) in the ASRS within a time interval. As the WES may receive order fulfillment data that indicates the one or more articles that to be transported to the ASRS and/or one or more articles to be transported from the ASRS, the WES may determine the rack-specific expected throughput rate based the order fulfillment data and the inventory tracking data.

In the present disclosure, the term "throughput range" refers to a range of throughput rates. For example, an example throughput range may comprise an "upper throughput limit" that indicates a ceiling throughput rate and a "lower throughput limit" that indicates floor throughput rate. As an example, a throughput range may be between 5 articles per minute (e.g. a lower throughput limit) and 10 articles per minute (e.g. an upper throughput limit).

In the present disclosure, the term "device-specific throughput range" refers to a throughput range that is associated with or correlated to a specific article transport device.

In the present disclosure, the term "speed setting" refers to a setting associated with an article transport device that controls the speed of the movement of the article transport device, and therefore controls the speed of the movement of the article that the article transport device carries. For example, as described herein, vertical transport devices, MDR devices, and/or horizontal transport devices are driven by motors. In such an example, adjusting speed settings of these devices causes an adjustment of speeds of their motors. For example, an increase in the speed setting increases the speed of the motor, which in turn increases the speed of the device transporting the article. Additionally, or alternatively, a decrease in the speed setting decreases the speed of the motor, which in turn decreases the speed of the device transporting the article In the present disclosure, the term "device-specific speed setting" refers to a speed setting that is associated with or correlated to a specific article transport device FIG. 1 illustrates at least a portion of an example automated storage and retrieval system (ASRS) 100 in a warehouse environment in accordance with some example embodiments described herein.

As described above, an example ASRS can automatically place articles received from a conveying system (such as, but not limited to, a conveyor) to a storage location (such as, but not limited to, a storage location in a storage level of a storage rack), and can automatically retrieve articles from a storage location (such as, but not limited to, a storage location in a storage level of a storage rack) to a conveying system (such as, but not limited to, a conveyor). To achieve such functions, the example ASRS 100 in the example shown in FIG. 1 comprises a workstation 101 and one or more article transport devices such as, but not limited to, one or more common conveyors 103, one or more rack feeding conveyors 107, one or more vertical transport devices 105, one or more level feeding conveyors 109, and/or one or more horizontal transport devices 111. In some embodiments, the one or more rack feeding conveyors 107 and the one or more level feeding conveyors 109 may comprise one or more motor driven roller (MDR) devices. In some embodiments, the example ASRS 100 comprises one or more storage racks 113, and each of the storage racks 113 comprises one or more storage levels 115 that provide storage locations for storing articles.

In the example shown in FIG. 1, the workstation 101 may comprise a controller device (such as, but not limited to, a desktop computer, a laptop computer, and/or the like) that is part of a warehouse execution system (WES). In some embodiments, the WES may store or receive data such as, but not limited to, inventory tracking data and/or order fulfillment data as defined above.

In some embodiments, the WES may control the operations of the one or more common conveyors 103, the one or more rack feeding conveyors 107, the one or more vertical transport devices 105, the one or more level feeding conveyors 109, and/or the one or more horizontal transport devices 111 to retrieve articles from one or more storage levels 115 of the one or more storage racks 113, such that, for example, said articles can be picked up by a worker. In some embodiments, the WES may control the operations of the one or more common conveyors 103, the one or more rack feeding conveyors 107, the one or more vertical transport devices 105, the one or more level feeding conveyors 109, and/or the one or more horizontal transport devices 111 to store articles (e.g. placed on the one or more common conveyors 103 by the worker) to the one or more storage levels 115 of the one or more storage racks 113.

In the example shown in FIG. 1, the one or more common conveyors 103 and one or more rack feeding conveyors 107 are connected to one another, such that articles on the one or more common conveyors 103 can be transported to one of the one or more rack feeding conveyors 107, and/or articles on the one or more rack feeding conveyors 107 can be transported to the one or more common conveyors 103.

In particular, the WES may track locations of articles placed on the one or more common conveyors 103 (for example, based on one or more sensing signals from sensors embedded on the one or more common conveyors 103) and activate/operate one of the one or more rack feeding conveyors 107 when the article travels to a location at or near the rack feeding conveyor.

For example, based on the article fulfillment data, the WES may determine that an article is to be stored at a storage rack 113A, and a rack feeding conveyor 107A is assigned to transport articles to and/or from the storage rack 113A. A worker may place the article on the one or more common conveyors 103. When the article travels near the rack feeding conveyor 107A, the WES or a device controller of the rack feeding conveyor 107A may cause the rack feeding conveyor 107A to be activated/operated so as to divert the article from the one or more common conveyors 103 to the rack feeding conveyor 107A.

In some embodiments, rack feeding conveyor assignment data may indicate which storage rack(s) that one rack feeding conveyor is configured to convey articles to and/or from. In some embodiments, the rack feeding conveyor assignment data may be stored in a controller device such as, but not limited to, the WES, a rack feeding conveyor controller, and/or a MDR controller of a MDR that is part of the rack feeding conveyor.

For example, based on rack feeding conveyor assignment data, one rack feeding conveyor is assigned to convey articles to and/or from one storage rack. For example, in FIG. 1, the rack feeding conveyor 107A may be assigned to convey articles to and/or from the storage rack 113A, and the rack feeding conveyor 107B may be assigned to convey articles to and/or from the storage rack 113B.

Additionally, or alternatively, based on rack feeding conveyor assignment data, one rack feeding conveyor can be assigned to convey articles to or from multiple storage racks. For example, in FIG. 1, the rack feeding conveyor 107A may be assigned to convey articles to the storage rack 113A and the storage rack 113B, and the rack feeding conveyor 107B may be assigned to convey articles from the storage rack 113A and the storage rack 113B. In such an example, the rack feeding conveyor 107A may be an inbound feeding conveyor to the storage rack 113A and the storage rack 113B, and the rack feeding conveyor 107B may be an outbound feeding conveyor to the storage rack 113A and the storage rack 113B.

Additionally, or alternatively, based on rack feeding conveyor assignment data, one rack feeding conveyor is assigned to convey articles to and/or from multiple storage racks. For example, in FIG. 1, both the rack feeding conveyor 107A and the rack feeding conveyor 107B may be assigned to convey articles to and/or from the storage rack 113A and the storage rack 113B.

In some embodiments, the one or more rack feeding conveyors 107 and the one or more common conveyors 103 may be secured to the ground, and the destination storage location of an article can be high up in one of the storage levels of a storage rack. As described above, the example ASRS 100 comprises one or more vertical transport devices 105, where each of the vertical transport devices 105 is configured to vertically convey (e.g. lift or drop) articles from one of the rack feeding conveyors 107 to or from a height that corresponds to a storage level for the articles.

In some embodiments, vertical transport device assignment data may indicate which storage rack(s) and/or which storage level(s) that one vertical transport device is configured to convey articles to and/or from. In some embodiments, the vertical transport device assignment data may be stored in a controller device such as, but not limited to, the WES and/or a vertical transport device controller.

For example, based on vertical transport device assignment data, one vertical transport device is assigned to convey articles to and/or from one storage rack. For example, in FIG. 1, the vertical transport device 105A may be assigned to convey articles to and/or from one or more storage levels of the storage rack 113A.

Additionally, or alternatively, based on vertical transport device assignment data, one vertical transport device is assigned to convey articles to or from multiple storage racks. For example, in FIG. 1, the vertical transport device 105A may be assigned to convey articles to and/or from one or more storage levels of the storage rack 113A and of the storage rack 113B.

In some embodiments, one vertical transport device is assigned to convey articles to and/or from one storage level. In some embodiments, one vertical transport device is assigned to convey articles to and/or from multiple storage levels.

In some embodiments, multiple vertical transport devices may be assigned to one storage rack, and different vertical transport devices convey articles to and/or from different storage level(s) of the storage rack. For example, a first vertical transport device may be assigned to convey articles to and/or from a first storage level or a first range of storage levels, and a second vertical transport device may be assigned to convey articles to and/or from a second storage level or a second range of storage levels. In some embodiments, the first range of storage levels and the second range of storage levels do not overlap. In some embodiments, the first range of storage levels and the second range of storage levels overlap.

In the example shown in FIG. 1, one level feeding conveyor is assigned/secured to each storage level and is configured to convey articles to and/or from one of the vertical transport devices. For example, the level feeding conveyor 109A is configured to convey articles to and/or from the vertical transport device 105A, and the level feeding conveyor 109B is configured to convey articles to and/or from the vertical transport device 105B.

In some embodiments, storage racks may be positioned adjacent to one another and form aisles between the storage racks. One or more horizontal transport devices may be positioned in the aisles and secured to one level of two storage racks such that they can convey articles from level feeding conveyors into storage locations on storage levels associated with storage racks.

For example, the horizontal transport device 111A may be positioned in the aisle formed between the storage rack 113A and the storage rack 113B, and may be secured on the storage level 115A of the storage rack 113A and the storage level 115B of the storage rack 113B. The storage level 115A and the storage level 115B may be at the same height. In such an example, the horizontal transport device 111A is configured to transport articles to and/or from the storage level 115A of the storage rack 113A and the storage level 115B of the storage rack 113B from and/or to the level feeding conveyor 109A and/or the level feeding conveyor 109B. Additionally, or alternatively, the horizontal transport device 111A may retrieve an article from a storage location on the storage level 115A of the storage rack 113A, and place the article on the level feeding conveyor 109B. Additionally, or alternatively, the horizontal transport device 111A may receive an article from the article on the level feeding conveyor 109A, and place the article in a storage location on the storage level 115B of the storage rack 113B.

FIG. 2A, FIG. 2B, FIG. 2C, FIG. 2D, FIG. 2E, FIG. 2F, and FIG. 2G illustrate example operations associated with an example ASRS 200 in accordance with some example embodiments described herein.

As described above, the example ASRS may implement one or more article transport devices such as, but not limited to, one or more vertical transport devices, one or more MDR devices (e.g. from one or more rack feeding conveyors and/or from one or more level feeding conveyors), and/or one or more horizontal transport devices, to transport articles. FIG. 2A to FIG. 2G illustrate example operations of the one or more article transport devices that transport an article 202 to a destination storage location, such as a location on a storage level 218 of a storage rack 216.

Figure 2A:
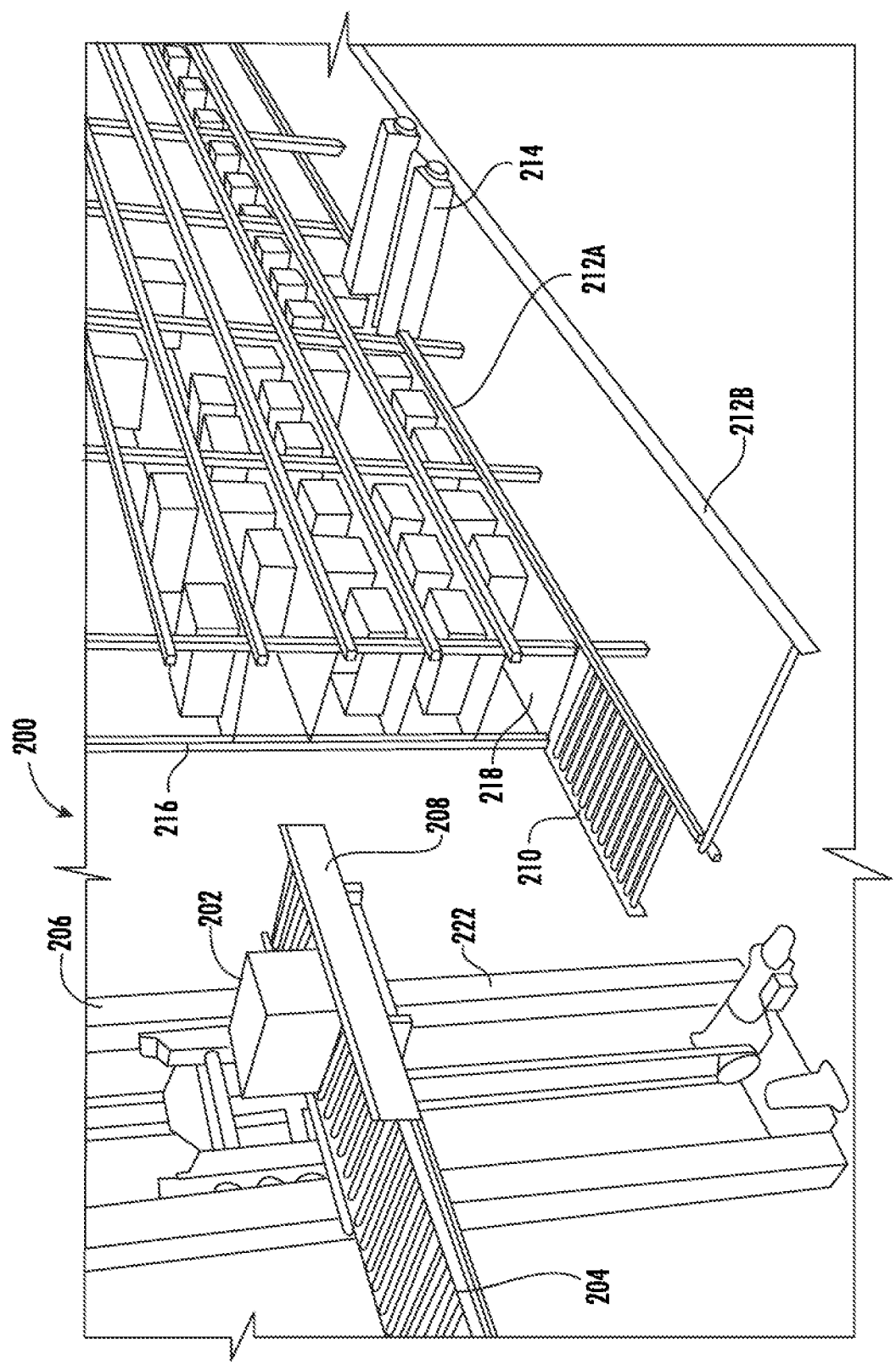

Referring now to FIG. 2A, the article 202 is conveyed by the rack feeding conveyor 204. For example, based on the rack feeding conveyor assignment data, the rack feeding conveyor 204 is assigned to convey all articles to and/or from the storage rack 216, which is the storage rack of the destination storage location for the article 202 based on the order fulfillment data. In some embodiments, the rack feeding conveyor 204 comprises MDR devices that transport the article 202 using a motor.

In the example shown in FIG. 2A, the example ASRS 200 comprises a vertical transport device 208 that is secured to a supporting rail 222 of a vertical structure 206 and can move up and down along the supporting rail 222 of the vertical structure 206. As described above, the vertical transport device assignment data may indicate which storage rack(s) and/or which storage level(s) that the vertical transport device 208 is configured to convey articles to and/or from.

As an example, the vertical transport device 208 is assigned to transport articles to convey articles to storage levels and storage racks that include the storage level 218 of the storage rack 216, which is the destination storage location of the article 202 based on the order fulfillment data. In response to and/or subsequent to the rack feeding conveyor 204 receives the article 202, the WES and/or the vertical transport device controller causes the vertical transport device 208 to travel along the supporting rail 222 so that the vertical transport device 208 is positioned on the same height as the rack feeding conveyor 204. In some embodiments, the vertical structure 206 is positioned adjacent to the rack feeding conveyor 204, such that when the vertical transport device 208 is positioned at the same height as the height of the rack feeding conveyor 204, the vertical transport device 208 is connected to the rack feeding conveyor 204 and/or there is little or no gap between the vertical transport device 208 and the rack feeding conveyor 204. As such, the vertical transport device 208 receives the article 202 from the rack feeding conveyor 204.

In the example shown in FIG. 2A, a longitudinal axis of the rack feeding conveyor 204 overlaps and/or is in parallel with a longitudinal axis of the vertical transport device 208. In some embodiments, the longitudinal axis of the rack feeding conveyor 204 and the longitudinal axis of the vertical transport device 208 may be at an angle.

Referring now to FIG. 2B, subsequent to the vertical transport device 208 receiving the article 202, the vertical transport device 208 travels down to the same height as the height of the storage level 218. For example, the WES and/or the vertical transport device controller determines the destination storage location of the article 202 (for example, the storage level 218 of the storage rack 216), and causes the vertical transport device 208 to travel along the supporting rail 222 to the storage level corresponding to the destination storage location (for example, storage level 218).

As described above, the ASRS 200 may comprise a plurality of level feeding conveyors, each secured to a storage level of a storage rack. In the example shown in FIG. 2B, a level feeding conveyor 210 is secured to the storage level 218 of the storage rack 216 through, for example but not limited to, supporting beams. For example, the level feeding conveyor 210 may be positioned at the same height as the height of the storage level 218 of the storage rack 216.

In some embodiments, the vertical structure 206 is positioned adjacent to the level feeding conveyor 210, such that when the vertical transport device 208 is positioned at the same height as the height of the level feeding conveyor 210, the vertical transport device 208 is connected to the level feeding conveyor 210 and/or there is little or no gap between the vertical transport device 208 and the level feeding conveyor 210. In some embodiments, the vertical transport device 208 comprises MDR devices to transport the article 202 to the level feeding conveyor 210 using a motor.

In some embodiments, the level feeding conveyor 210 comprises MDR devices to further transport the article 202. For example, subsequent to receiving the article 202, the WES and/or the level feeding conveyor controller causes the MDR device of the level feeding conveyor 210 to transport the article 202 at a speed setting.

In the example shown in FIG. 2B, a longitudinal axis of the level feeding conveyor 210 overlaps and/or is in parallel with a longitudinal axis of the storage rack 216. In some embodiments, the longitudinal axis of the level feeding conveyor 210 and the longitudinal axis of the storage rack 216 may be at an angle.

Figure 2D:
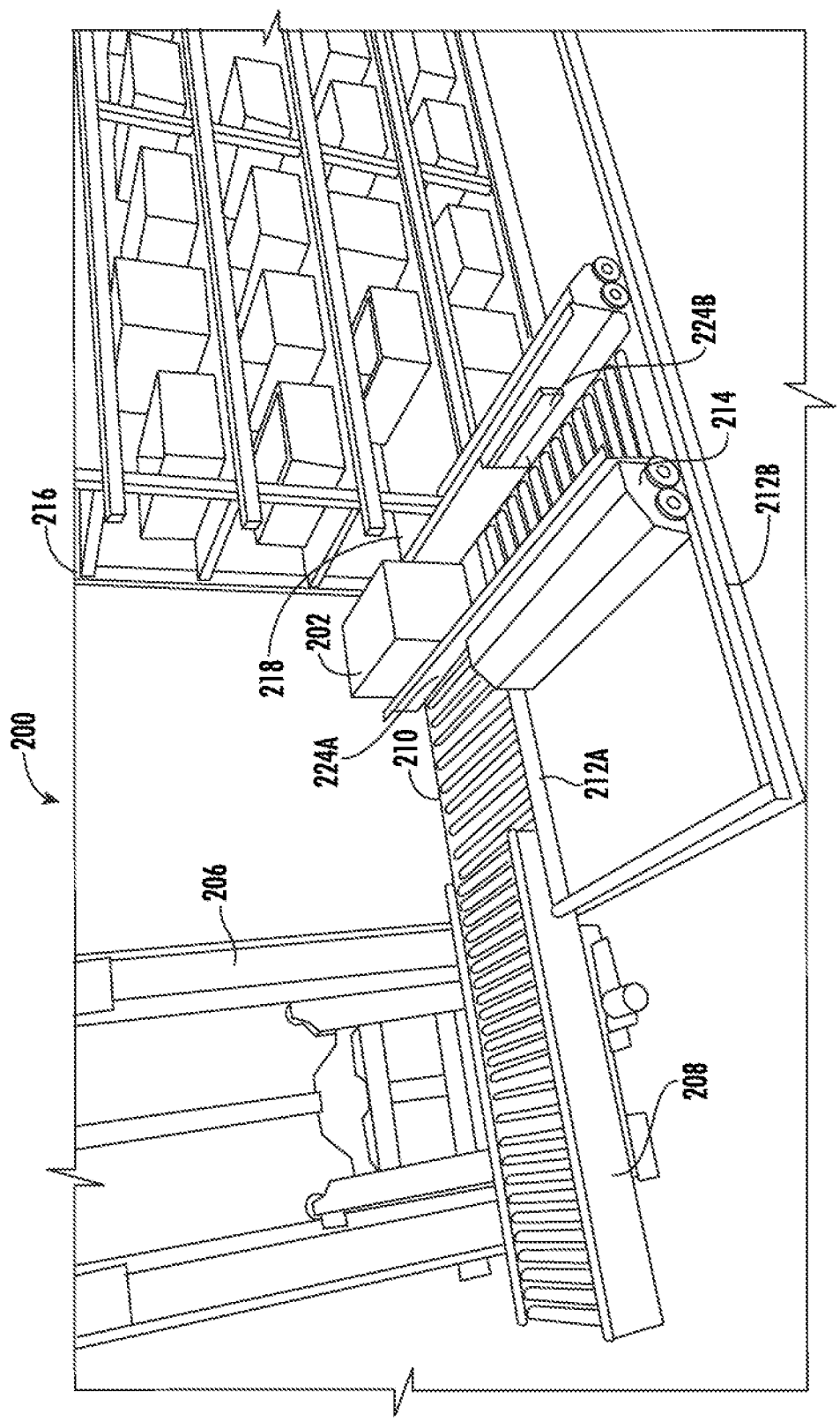
Figure 2C:
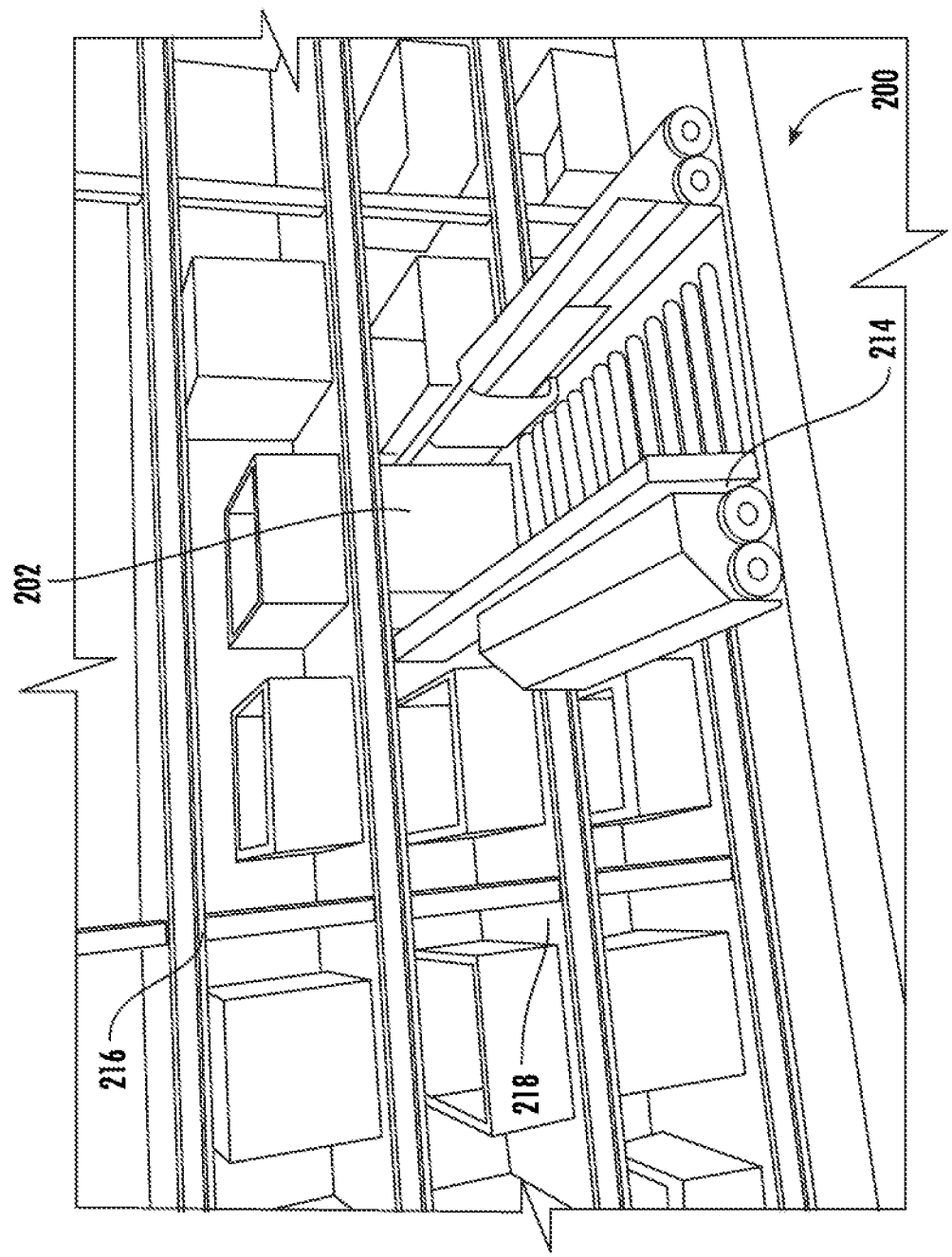

Referring now to FIG. 2C, in response to and/or subsequent to the rack feeding conveyor 204 or the vertical transport device 208 receiving the article 202, the horizontal transport device 214 travels to a location adjacent to the level feeding conveyor 210.

As described above, the ASRS 200 may comprise a plurality of horizontal transport devices, each secured to a storage level of a storage rack. In the example shown in FIG. 2C, the horizontal transport device 214 may be secured between the storage frame 212A and the storage frame 212B, and may be moveable along the storage frame 212A and the storage frame 212B using motorized wheels. In some embodiments, each of the storage frames may be an edge frame of a storage level of a storage rack. As such, the horizontal transport device 214 is moveable along an aisle between storage racks at the storage level 218.

In some embodiments, the horizontal transport device 214 comprises one or more sensors configured to detect the presence of the article on the level feeding conveyor 210 and to stop the horizontal transport device 214 at a location adjacent to the article 202 so as to initiate a transport of the article to the horizontal transport device 214.

Referring now to FIG. 2D and FIG. 2E, subsequent to the horizontal transport device 214 stops adjacent to the article 202, the horizontal transport device 214 may move the article 202 onto a supporting frame of the horizontal transport device 214.

For example, the horizontal transport device 214 may comprise a first loading arm 224A and a second loading arm 224B that can be extended. In some embodiments, each of the first loading arm 224A and the second loading arm 224B may comprise one or more engagement structures that are deployable to engage with the article 202 so as to move the article 202 onto the supporting frame of the horizontal transport device 214, details of which are described in connection with at least FIG. 4A and FIG. 4B.

Referring now to FIG. 2F and FIG. 2G, the horizontal transport device 214 moves along the storage frame 212A and the storage frame 212B and stops at a location that is adjacent to the destination storage location of the article 202 on the storage level 218. Subsequently, the WES and/or the horizontal transport device controller causes the horizontal transport device 214 to extend the first loading arm 224A and second loading arm 224B of the horizontal transport device 214 and/or to deploy the engagement structures so as to move the article 202 from the supporting frame of the horizontal transport device 214 onto the destination storage location, details of which are described in connection with at least FIG. 4A and FIG. 4B.

While the description above provides an example of an ASRS, it is noted that the scope of the present disclosure is not limited to the description above. In some examples, an example ASRS may comprise one or more additional and/or alternative elements, and/or may be structured differently than those illustrated in FIG. 2A to FIG. 2G.

Figure 3A:
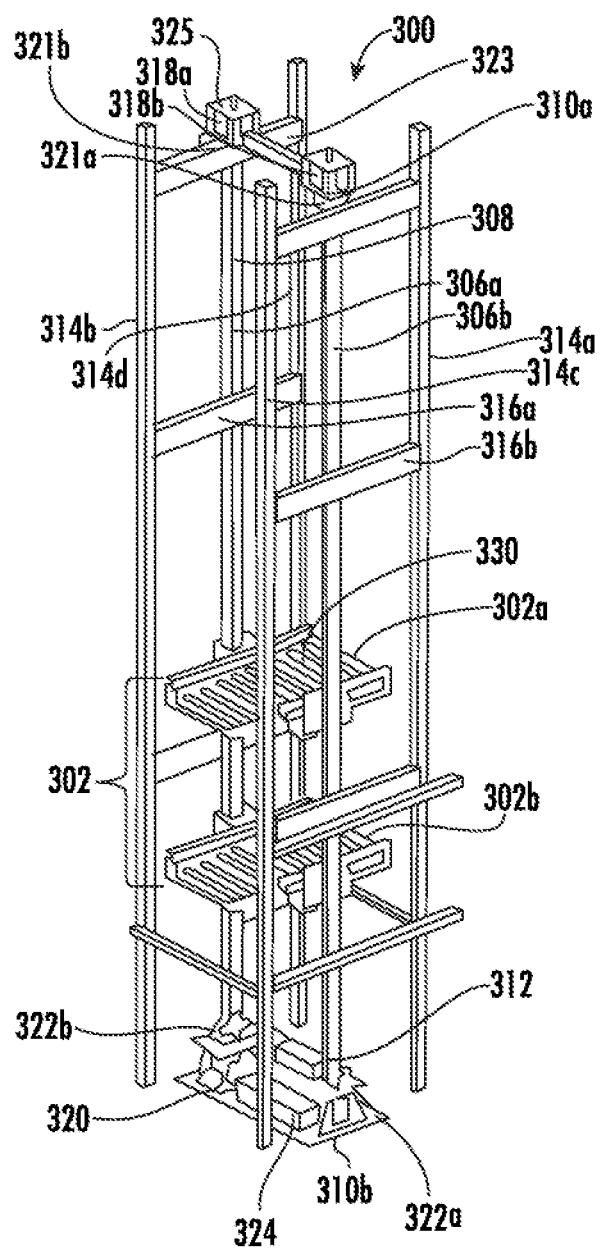
FIG. 3A and FIG. 3B illustrate example vertical transport devices in accordance with some example embodiments described herein.
Figure 3B:
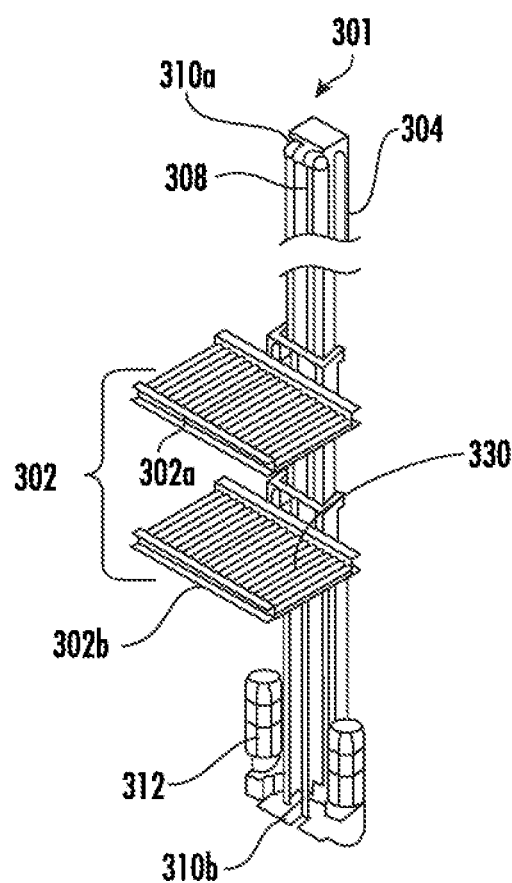

FIG. 3A and FIG. 3B illustrate example vertical transport devices in accordance with some example embodiments described herein.

Referring now to FIG. 3A and FIG. 3B, example perspective views of a vertical transport device 302 on two different vertical structures (e.g. the vertical structure 300 and the vertical structure 301) in accordance with various embodiments of the present disclosure are illustrated.

FIG. 3A illustrates an embodiment of the vertical transport device 302 mounted to a vertical structure 300 having two supporting rails 306a and 306b, where the supporting rail 306a is installed in parallel with the other supporting rail 306b with two vertical transport devices 302 positioned in between the rails. FIG. 3B illustrates an embodiment of the vertical transport device 302 mounted to a vertical structure 301 having a central supporting rail 304. Both examples shown in FIG. 3A and FIG. 3B include two vertical transport devices 302 independently movable on the supporting rail 304 or supporting rails 306a, 306b to handle articles stored in the storage racks of the ASRS.

While the description above provides an example of two vertical transport devices on a vertical structure, it is noted that the scope of the present disclosure is not limited to the description above. In some examples, less than two or more than two vertical transport devices may be moveable along supporting rail(s) of a vertical structure.

In some examples, the first vertical transport device 302a may be employed to transport the articles to and/or from a first set of storage levels and the second vertical transport device 302b may be employed to transport the articles to and/or from a second set of storage levels. In some examples, both the first vertical transport device 302a and the second vertical transport device 302b may be employed to transport articles to and/or from any of the storage levels of the storage rack.

In some examples, the first vertical transport device 302a may pick the articles from a rack feeding conveyor and deposit the articles to a level feeding conveyor at a selected storage level, and the second vertical transport device 302b may pick the articles from the level feeding conveyor of the selected storage level and deposit the articles at the rack feeding conveyor. In some examples, both the first vertical transport device 302a and the second vertical transport device 302b may simultaneously pick and deposit the articles from and/or to the level feeding conveyor(s) and the rack feeding conveyor(s).

In some examples, both the first vertical transport device 302a and the second vertical transport device 302b may pick the articles from the rack feeding conveyor and deposit the article at a common level feeding conveyor at a selected storage level without collision between the first vertical transport device 302a and the second vertical transport device 302b. Similarly, both the first vertical transport device 302a and the second vertical transport device 302b may pick the articles from the common level feeding conveyor at the selected storage level and deposit the articles at the rack feeding conveyor without collision between the first vertical transport device 302a and the second vertical transport device 302b.

According to an embodiment, the first vertical transport device 302a and the second vertical transport device 302b are driven independently using driving systems. The driving systems may include drive belts 308, drive pulleys 310a, 310b, and drive motors 312. The drive belts 308 are received for vertical rotation respectively on a pair of top drive pulleys 310a and received independently on a pair of bottom drive pulleys 310b, wherein the bottom drive pulleys 310b are driven by a pair of drive motors 312. The drive motors 312 independently rotate the bottom drive pulleys 310b to independently control movement of the first vertical transport device 302a and the second vertical transport device 302b. As such, adjusting the speed settings of the first vertical transport device 302a and the second vertical transport device 302b may cause an adjustment of the speed of the drive motors 312 so as to change the speed at which articles are transported by the vertical transport devices.

In some embodiments, as shown in FIG. 3A and FIG. 3B, the drive belts are installed on the supporting rail 304 or supporting rails 306a, 306b. In FIG. 3A, the drive belts 308 are installed on the parallel supporting rails 306a, 306b, one drive belt on each supporting rail 306a, 306b. In FIG. 3B, the drive belts 308 are installed on the central supporting rail 304. According to an embodiment, the drive belts 308 facilitate the movement of the first vertical transport device 302a and the second vertical transport device 302b on the supporting rail 304 or supporting rails 306a, 306b under the influence of the drive motors 312.

According to an embodiment, as shown in FIG. 3A, each supporting rail 306a, 306b is mounted to a pair of vertical masts. For example, a first supporting rail 306a may be positioned in between a first pair of vertical masts 314b and 314d and a second supporting rail 306b positioned in between a second pair of vertical masts 314a and 314c. The first supporting rail 306a and the second supporting rail 306b are mounted to the first pair of vertical masts 314b/314d and the second pair of vertical masts 314a/314c, respectively, using mounting brackets 316a and 316b. According to an embodiment, the first supporting rail 306a and the second supporting rail 306b are mounted to a pair of top housings 318a, 318b and a bottom housing 320 common for the first supporting rail 306a and the second supporting rail 306b. For example, one end of the first supporting rail 306a and the second supporting rail 306b may be attached to a first set of attachment plates 321a and 321b on the pair of top housings 318a and 318b, and other end of the first supporting rail 306a and the second supporting rail 306b may be attached to a second set of attachment plates 322a, 322b on the bottom housing 320. In some embodiments, the attachment plates 321a, 321b, 322a, 322b ensure proper alignment of the first supporting rail 306a and the second supporting rail 306b. In some examples, the bottom housing 320 may include components such as the drive motors 312, bottom drive pulleys 310b, bearings (not shown), and bottom spreader 324. In some examples, the pair of top housings 318a, 318b may include components such as the top drive pulleys 310a, bearings (not shown), top spreader 323, and a pair of access plates 325 for maintenance of the components inside the top housings 318a, 318b. In some embodiments, the first vertical transport device 302a and the second vertical transport device 302b positioned in between the top housings 318a, 318b and the bottom housing 320 are driven independently using the components inside the top housings 318a, 318b and the bottom housing 320.

In some embodiments, the first vertical transport device 302a and the second vertical transport device 302b may be positioned in the vertical structure having a single common supporting rail without any housings for the components.

In the embodiments shown in FIG. 3A and FIG. 3B, the vertical transport device 302 may include a plurality of conveyor rollers (such as, but not limited to, conveyor roller 330) with a conveyor belt wrapped around the rollers. In some embodiments, the rollers include at least one motorized drive roller (MDR). The MDR may drive the conveyor belt wrapped around the rollers to facilitate movement of the article vertically. In some examples, the MDR may be positioned in between the plurality of rollers and linked to neighboring conveyor rollers using O-Bands. In some examples, the MDR may be positioned as an end roller or next to a non-motorized end roller and linked to neighboring conveyor rollers using the O-Bands. In some embodiments, the vertical transport device 302a or 302b may include two sets of conveyor rollers wrapped around independently using two conveyor belts with each set of conveyor rollers having at least one MDR to drive the conveyor belts. Such a configuration enables the two sets of conveyor rollers wrapped independently by two conveyor belts to be considered as two different conveyor zones, which are independently controlled to move the article into or out of the vertical transport device 302a or 302b. In some embodiments, an example vertical transport device may comprise other configurations for the MDRs.

Figure 4A:
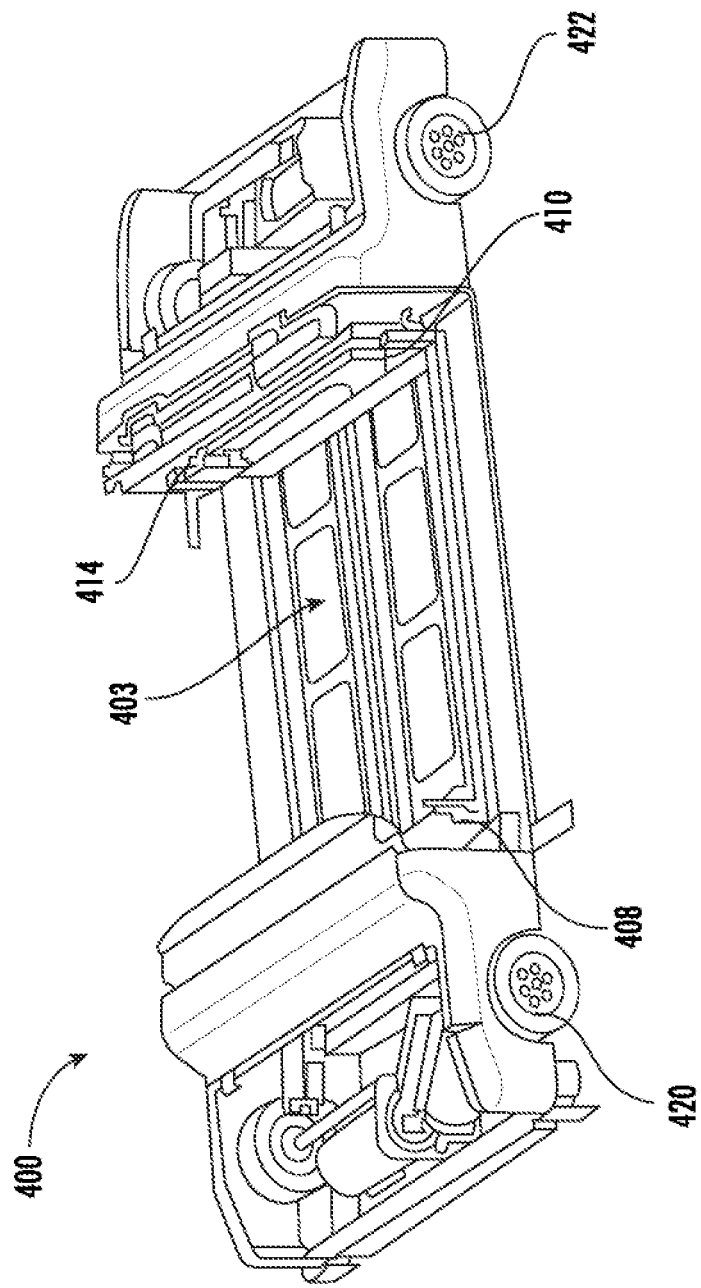
FIG. 4A and FIG. 4B illustrate an example horizontal transport device in accordance with some example embodiments described herein.
Figure 4B:
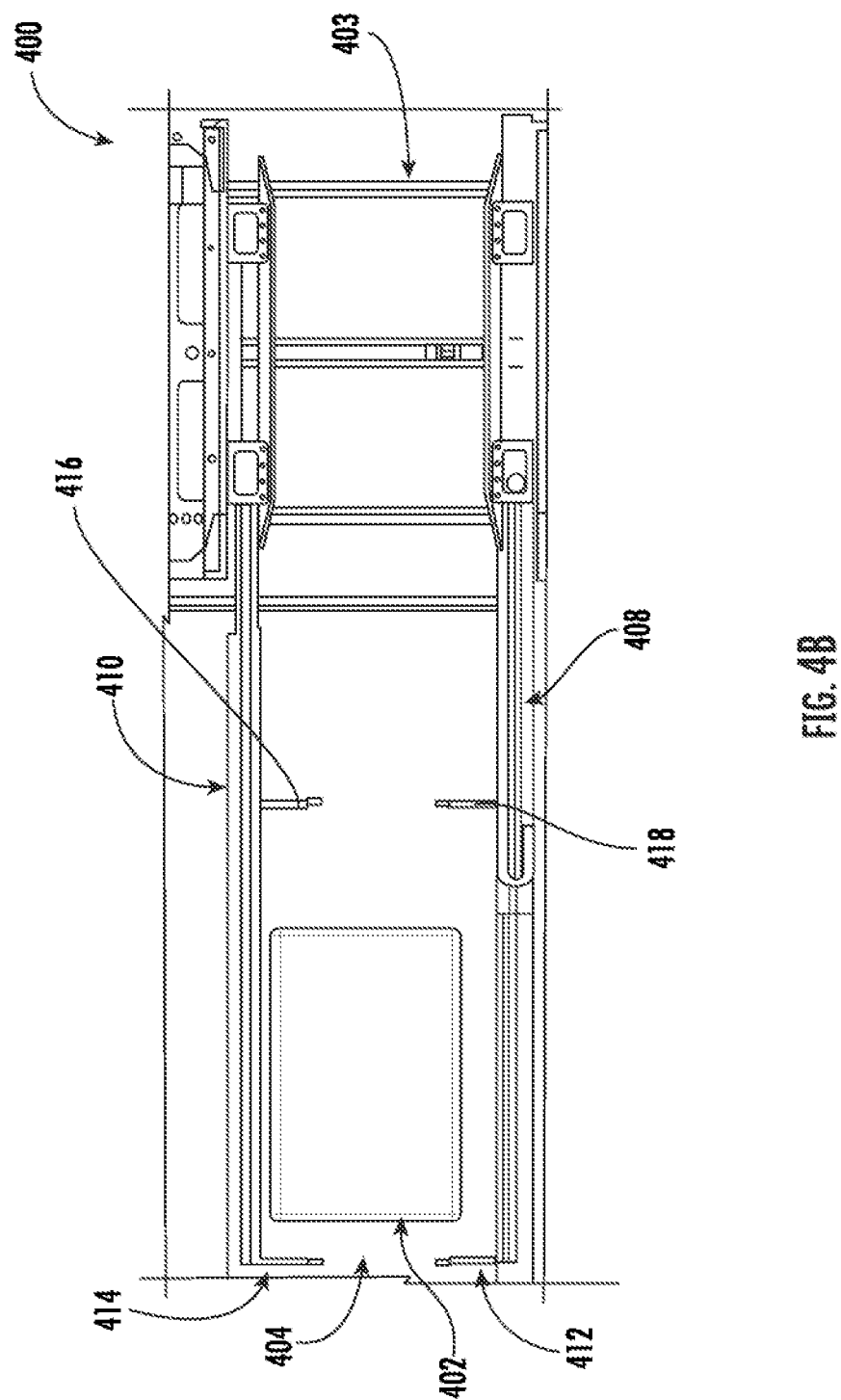

FIG. 4A and FIG. 4B illustrate an example horizontal transport device 400 in accordance with some example embodiments described herein. In particular, FIG. 4A illustrates an example perspective view of the example horizontal transport device 400, and FIG. 4B illustrates an example top view of the example horizontal transport device 400.

As shown in FIG. 4A, the horizontal transport device 400 may include motorized wheels or an equivalent mechanism configured to cause movement of the horizontal transport device 400 to retrieve or pick an article. For example, horizontal transport device 400 may comprise wheels 420 and 422 that are driven by a motor that causes the horizontal movement of the horizontal transport device 400 so as to transport articles. In such an example, adjusting the speed settings of the horizontal transport device 400 may cause an adjustment of the speed of the motor so as to change the speed at which articles are transported.

As shown in FIG. 4A and FIG. 4B, the horizontal transport device 400 may include a frame 403 upon which articles may be supported. By way of example, the frame 403 may be formed by a plurality of members having any dimension (e.g., size and shape) as applicable and may be configured to support one or more elements of the horizontal transport device 400. Following a retrieval operation, the frame 403 may be configured to house, enclose, or otherwise support the article 402 that has been retrieved by the horizontal transport device 400 thereon for movement to another location.

The horizontal transport device 400 may further include a pair of loading arms 408 and 410 that are movably attached to the frame 403. The pair of loading arms 408 and 410 may be configured or otherwise dimensioned (e.g., sized and shaped) to translate between a retracted configuration proximate the frame 403 as shown in FIG. 4A and an extended configuration as shown in FIG. 4B. The pair of loading arms 408 and 410 may, for example, be configured as nesting sections that, in the retracted position, nest in one another. In some embodiments, the pair of loading arms 408 and 410 may alternatively or additionally be formed of one or more sections that sequentially stack so as to be contained with the frame 403 (e.g., without extending beyond an outer edge of the frame 403). In some embodiments, the one or more loading arms 408 and 410 may be formed as single, integral members whose dimensions coincide with or otherwise match a corresponding dimension of the frame 403 such that a stacking or nesting feature is unnecessary. In any embodiment, the pair of loading arms 408 and 410 may have any dimension (e.g., size and shape) based upon the intended application of the horizontal transport device 400 and/or the corresponding dimensions of the article 402 to be retrieved.

In some embodiments, the pair of loading arms 408 and 410 may be operably connected to one or more motors, rollers, or equivalent mechanisms for causing motion of the pair of loading arms 408 and 410 between the retracted and extended configurations. In some embodiments, the horizontal transport device 400 may include any number of devices, structures, etc. to cause, for example, translation of the pair of loading arms 408 and 410 relative to the frame 403.

Referring now to FIG. 4B, in order to effectuate movement of the article 402, the horizontal transport device 400 may include engagement structures 412, 414, 416, and/or 418, each movably attached to one of the pair of loading arms 408 and 410. The at least one engagement structure 412, 414, 416, and/or 418 may, for example, include a first engagement structure 412 and a fourth engagement structure 418 movably attached to the first loading arm 408, and a second engagement structure 414 and a third engagement structure 416 movably attached to the second loading arm 410. In some embodiments, the first engagement structure 412 is positioned at an end of the first loading arm 408, and the fourth engagement structure 418 is positioned at a distance from the first engagement structure 412. In some embodiments, the second engagement structure 414 is positioned at an end of the second loading arm 410, and the third engagement structure 416 is positioned at a distance from the second engagement structure 414.

In some embodiments, engagement structures 412, 414, 416, and 418 may translate between a stored configuration and a deployed configuration.

In FIG. 4A, the engagement structures (such as the engagement structure 414) may be in a stored configuration where the engagement structures are retracted so as to enable movement of the pair of loading arms 408 and 410 proximate the article 402. By way of example, in some embodiments, the first engagement structure 412 and the second engagement structure 414 in the stored configurations may be positioned substantially parallel with respect to and/or in contact with the first loading arm 408 and the second loading arm 410, respectively. In doing so, the first loading arm 408 and the second loading arm 410 may extend past the article 402, such that, when the engagement structures 412, 414 are deployed as described hereafter, the engagement structures 412, 414 may properly engage the article 402.

In FIG. 4B, the at least one engagement structure 412, 414 may be configured such that, in the deployed position, the first engagement structure 412 and the second engagement structure 414 may be perpendicular with respect to the first loading arm 408 and the second loading arm 410, respectively. By way of continued example, once the pair of loading arms 408 and 410 are in an extended configuration, such as a first position proximate a first article for retrieval, the first engagement structure 412 may move relative to the first loading arm 408, and the second engagement structure 414 may move relative to the second loading arm 410. By way of example, the first engagement structure 412, in some embodiments, may be pivotally attached to the first loading arm 408 such that movement from the stored position to the deployed position provides for rotational movement of the first engagement structure 412 relative to the first loading arm 408. Similarly, the second engagement structure 414, may be pivotally attached to the second loading arm 410 such that movement from the stored position to the deployed position provides for rotational movement of the second engagement structure 414 relative to the second loading arm 410.

Furthermore, in some embodiments, the engagement structures 412, 414, 416, and 418 may be operably connected to one or more motors, rollers, or equivalent mechanisms for causing motion of engagement structures between the stored and deployed positions.

As shown in the deployed configuration of FIG. 4B, the first engagement structure 412 may, in some embodiments, define a first pair of arms, and the second engagement structure 414 may define a second pair of arms. In this way, the first engagement structure 412 and the second engagement structure 414 may be collectively configured to bound the article 402. Said differently, in order to cause movement (e.g., during retraction of the loading arms to the retracted position) of the article 402, the first engagement structure 412 and second engagement structure 414 may define one or more fingers, extensions, flanged portions, etc. configured to contact the article 402.

In some embodiments, to move the article 402 from the storage level or level feeding conveyor 404 onto the frame 403 of the horizontal transport device 400, the horizontal transport device 400 causes the first loading arm 408 and the second loading arm 410 to translate from a retracted configuration to an extended configuration so that they are proximate to the article 402, causes the engagement structures 412 and 414 to translate from stored configurations to a deploy configurations, and cause the first loading arm 408 and the second loading arm 410 to translate from the extended configuration to the retracted configuration such that engagement structures 412 and 414 move the article 402 onto the frame 403 of the horizontal transport device 400.

In some embodiments, to convey the article 402 from the frame 403 of the horizontal transport device 400 onto the storage level or level feeding conveyor 404, the horizontal transport device 400 causes the engagement structures 416 and 418 to translate from a stored configuration to a deploy configuration, and causes the first loading arm 408 and the second loading arm 410 to translate from a retracted configuration to an extended configuration such that engagement structures 416 and 418 push the article 402 from the frame 403 onto the storage level or level feeding conveyor 404.

Figure 5:
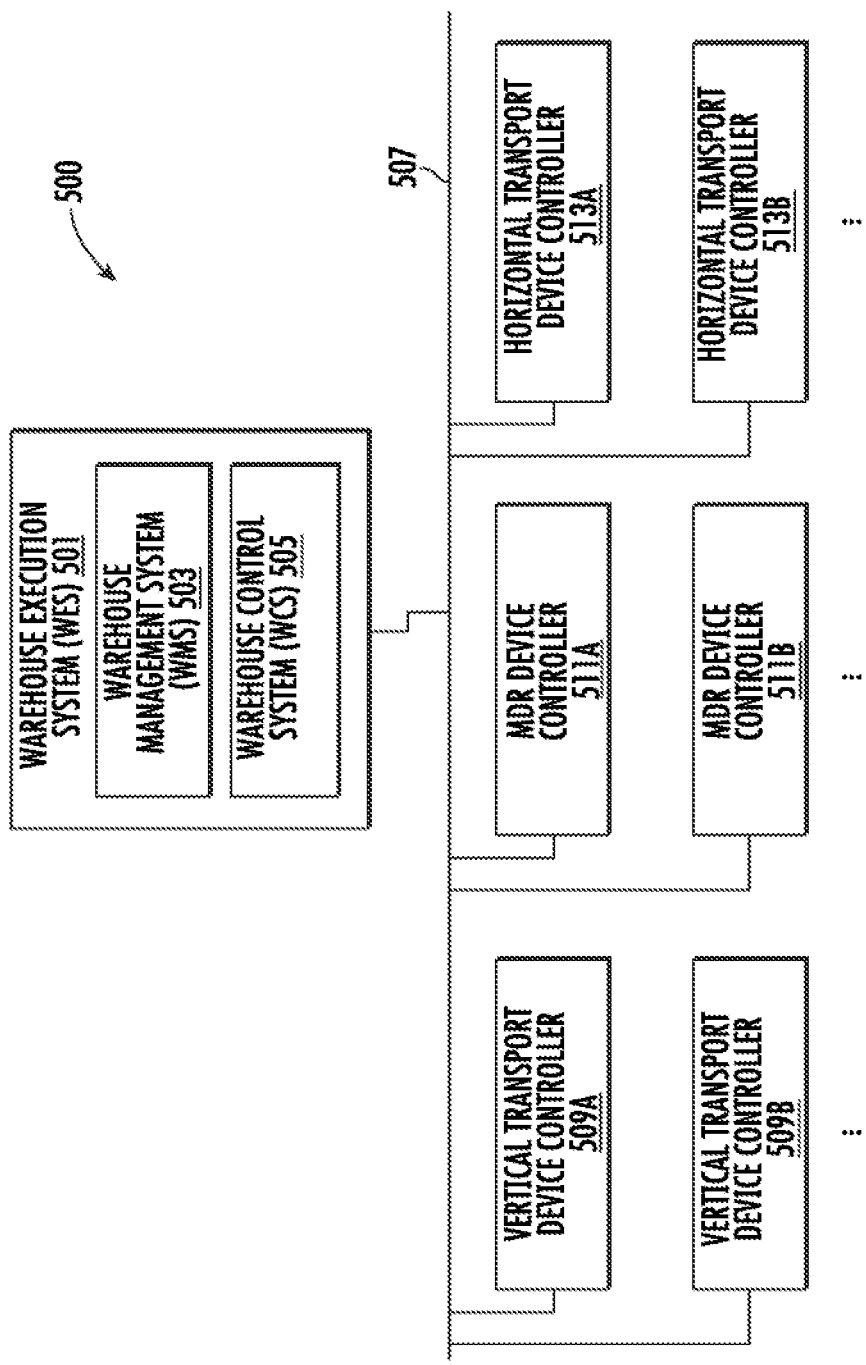
FIG. 5 illustrates an example schematic block diagram of an example ASRS control system associated with an example ASRS in accordance with some example embodiments described herein.

FIG. 5 illustrates an example schematic block diagram of an example ASRS control system 500 associated with an example ASRS in accordance with some example embodiments described herein.

In some embodiments, the ASRS control system 500 comprises a warehouse execution system (WES) 501 in electronic communication with one or more controllers (such as, but not limited to, vertical transport device controller 509A, vertical transport device controller 509B, MDR device controller 511A, MDR device controller 511B, horizontal transport device controller 513A, horizontal transport device controller 513B, . . . and/or the like) via a system bus 507.

In some embodiments, the WES 501 may comprise a warehouse management system (WMS) 503 that receives data such as, but not limited to, inventory tracking data and order fulfillment data. In some embodiments, the WMS 503 also stores data such as, but not limited to, assignment data as described herein.

In some embodiments, the WES 501 may comprise a warehouse control system (WCS) 505 controls the operations (such as speed settings) of article transport devices such as, but not limited to, common conveyors, rack feeding conveyors, vertical transport devices, level feeding conveyors, horizontal transport devices, and/or the like in the ASRS. In some embodiments, the WCS 505 controls the operations (such as speed settings) of the MDR devices in the ASRS.

In some embodiments, each of the vertical transport device controller 509A and the vertical transport device controller 509B may be in electronic communication with a vertical transport device to control the operation of the vertical transport device. For example, the vertical transport device controller may control the speed of the motor of the vertical transport device so as to control the speed of the vertical transport device in transporting articles.

In some embodiments, each of the horizontal transport device controller 513A and the horizontal transport device controller 513B may be in electronic communication with a horizontal transport device to control the operation of the horizontal transport device. For example, the horizontal transport device controller may control the speed of the motor of the horizontal transport device so as to control the speed of the horizontal transport device in transporting articles.

In some embodiments, each of the MDR device controller 511A and the MDR device controller 511B may be in electronic communication with a MDR device of a conveyor to control the operation of the MDR device. For example, the MDR device controller may control the speed of the motor of the MDR device so as to control the speed of the MDR device/conveyor in transporting articles.

In one embodiment, the system bus 507 may include, but are not limited to, any one or a combination of different types of suitable data communications mechanics and networks such as, for example, wires, cable networks, public networks (e.g., the Internet), private networks (e.g., frame-relay networks), local networks, wireless networks, cellular networks, telephone networks (e.g., a public switched telephone network), or any other suitable private and/or public networks. Further, the system bus 507 may have any suitable communication range associated therewith and may include, for example, global networks (e.g., the Internet), MANs, WANs, LANs, or PANs. In addition, the system bus 507 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the system bus 507 may utilize a variety of networking protocols including, but not limited to, TCP/IP based networking protocols. In some embodiments, the protocol is a custom protocol of JavaScript Object Notation (JSON) objects sent via a Web Socket channel. In some embodiments, the protocol is JSON over RPC, JSON over REST/HTTP, and/or the like.

Figure 6:
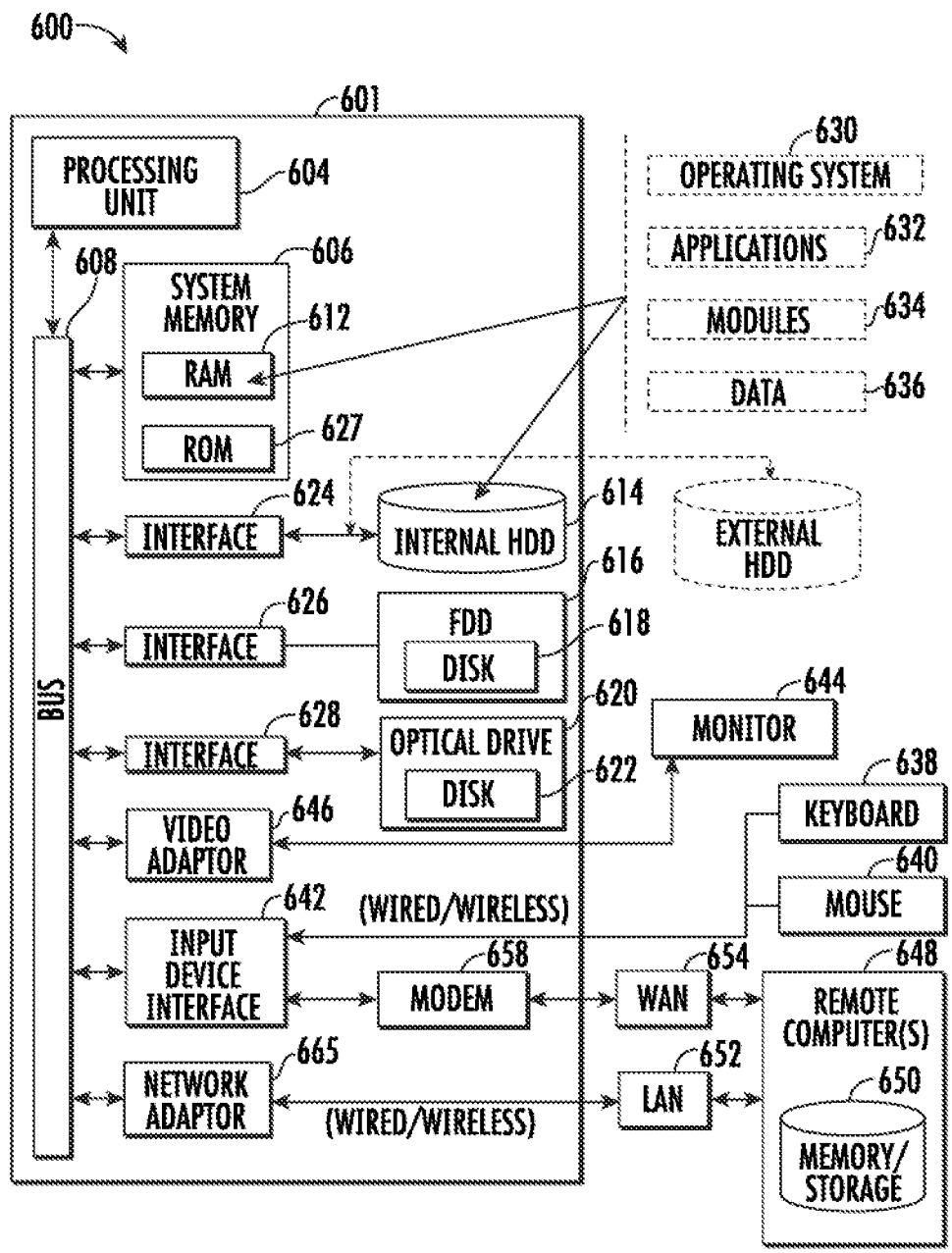
FIG. 6 illustrates an example schematic block diagram of an example controller device in accordance with some example embodiments described herein.

FIG. 6 illustrates an example schematic block diagram 600 of an example controller device 601 in accordance with some example embodiments described herein. For example, the example controller device 601 may be implemented as at least a part of the WMS 503 described above in connection with FIG. 5, at least a part of the WCS 505 described above in connection with FIG. 5, at least a part of the WES 501 described above in connection with FIG. 5, one of the vertical transport device controllers described above in connection with FIG. 5, one of the MDR device controllers described above in connection with FIG. 5, and/or one of the horizontal transport device controllers described above in connection with FIG. 5.

In the example shown in FIG. 6, the example controller device 601 can provide data processing and storage capabilities, as well as networking and communication capabilities between a wired or wireless communication network and a server and/or communication device. While the description above is in the general context of computer-executable instructions that can run on one or more computers, it is noted that the various embodiments also can be implemented in combination with other program modules and/or as a combination of hardware and software.

In some embodiments, program modules include routines, programs, components, data structures, etc., that perform particular tasks or implement particular abstract data types. In some embodiments, example methods described herein can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. In some embodiments, example methods described herein can be practiced in distributed computing environments where certain tasks are performed by remote processing devices that are linked through a communications network. In a distributed computing environment, program modules can be located in both local and remote memory storage devices.

An example controller device 601 in accordance with examples of the present disclosure may include a variety of media, which can include computer-readable storage media or communications media.

In some embodiments, computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some embodiments, communications media can embody computer-readable instructions, data structures, program modules or other structured or unstructured data in a non-transitory data signal. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the example shown in FIG. 6, the example controller device 601 includes a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604. As it employed in the subject disclosure, the term "processor" can refer to substantially any computing processing unit or device comprising, but not limited to comprising, single-core processors; single-processors with software multi-thread execution capability; multi-core processors; multi-core processors with software multi-thread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

The system bus 608 can be any of several types of bus structure that can further interconnect to a memory bus (with or without a memory controller), a peripheral bus, and a local bus using any of a variety of commercially available bus architectures. The system memory 606 includes ROM 627 and RAM 612. A basic input/output system (BIOS) is stored in a non-volatile memory such as ROM, EPROM, EEPROM, which BIOS contains the basic routines that help to transfer information between elements within the example controller device 601, such as during start-up. The RAM 612 can also include a high-speed RAM such as static RAM for caching data.

In some embodiments, the example controller device 601 includes an internal hard disk drive (HDD) 614 (e.g., EIDE, SATA), which can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The internal hard disk drive 614, magnetic disk drive 616 and optical disk drive 620 can be connected to the system bus 608 by a hard disk drive interface 624, a magnetic disk drive interface 626 and an optical drive interface 628, respectively. The hard disk drive interface 624 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. Although the description of computer-readable media above refers to a HDD, a removable magnetic diskette, and a removable optical media such as a CD or DVD, it should be appreciated by those skilled in the art that other types of media which are readable by an example controller device 601, such as zip drives, magnetic cassettes, flash memory cards, cartridges, and the like, can also be used in the example operating environment, and further, that any such media can contain computer-executable instructions for performing the methods of the disclosed embodiments.

In some embodiments, a number of program modules can be stored in the drives and RAM 612, including an operating system 630, one or more application programs 632, other program modules 634 and program data 636. All or portions of the operating system, applications, modules, and/or data can also be cached in the RAM 612. It is to be appreciated that the various embodiments can be implemented with various commercially available operating systems or combinations of operating systems.

In some embodiments, a user can enter commands and information into the example controller device 601 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

In some embodiments, a monitor 644 or other type of display device is connected to the system bus 608 through an interface, such as a video adapter 646. In some embodiments, an example controller device 601 may include other peripheral output devices (not shown), such as speakers, printers, etc.

In some embodiments, the example controller device 601 can operate in a networked environment using logical connections by wired and/or wireless communications to one or more remote computers, such as a remote computer(s) 648. The remote computer(s) 648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the example controller device 601 is connected to the local network (such as LAN 652) through a wired and/or wireless communication network interface or adapter 665. The adapter 665 may facilitate wired or wireless communication to the LAN 652, which may also include a wireless access point disposed thereon for communicating with the adapter 665 (such as a wireless adapter).

When used in a WAN networking environment, the example controller device 601 can include a modem 658, or is connected to a communications server on the WAN 654, or has other means for establishing communications over the WAN 654, such as by way of the Internet. The modem 658, which can be internal or external and a wired or wireless device, is connected to the system bus 608 through the input device interface 642. In a networked environment, program modules depicted relative to the computer, or portions thereof, can be stored in the memory/storage device 650 that is at a remote location. It will be appreciated that the network connections shown are exemplary and other means of establishing a communications link between the computers can be used.

In some embodiments, the example controller device 601 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

While the description above provides an example of an example controller device, it is noted that the scope of the present disclosure is not limited to the description above. In some examples, an example controller device may comprise less than the elements shown in FIG. 6. For example, an example controller device may comprise a processing unit, a system memory, and a communication interface. In some examples, an example controller device may comprise more than the elements shown in FIG. 6.

Various example methods described herein, including, for example, those as shown in FIG. 7 to FIG. 16, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 7 to FIG. 16 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 7:
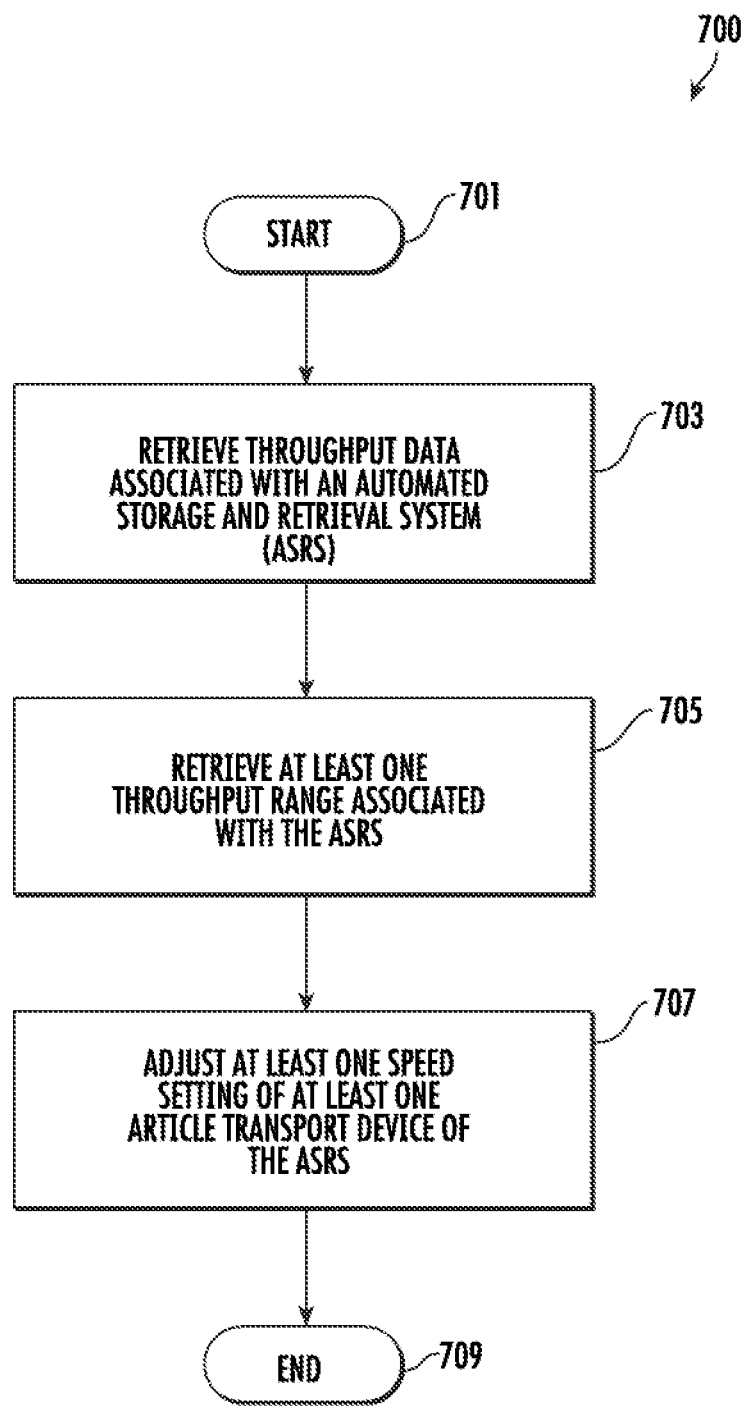
FIG. 7 is an example flow diagram illustrating an example method of controlling an example speed setting of an example article transport device of an example ASRS in accordance with some example embodiments described herein.

Referring now to FIG. 7, an example method 700 of controlling an example speed setting of an example article transport device of an example ASRS in accordance with embodiments of the present disclosure is illustrated. For example, the example method 700 dynamically adjusts speed settings of article transport devices of an ASRS based on the throughput data associated with the ASRS. As such, the example method 700 overcomes various technical challenges.

As shown in FIG. 7, the example method 700 starts at step/operation 701. Subsequent to and/or in response to step/operation 701, the example method 700 proceeds to step/operation 703. At step/operation 703, a controller device (such as, but not limited to, the WES and/or one of the controllers described herein in connection with at least FIG. 5 and FIG. 6) retrieves throughput data associated with an ASRS.

As described above, the throughput data indicates the actual amount of articles that are transported to, from, and within the ASRS within a time interval and/or the expected amount of articles that are transported to, from, and within the ASRS within the time interval. Accordingly, the throughput data comprises at least one of an actual throughput rate or an expected throughput rate associated with the ASRS.

In some embodiments, the throughput data comprises the actual throughput rate. In some embodiments, the actual throughput rate indicates at least one of an actual article inbound rate associated with the ASRS or an actual article outbound rate associated with the ASRS described above. In some embodiments, article transport devices of the ASRS may comprise sensors that can detect the presence of articles, and article transport devices may comprise controllers that can track the number of articles that are transported to the ASRS within the time interval (e.g. actual article inbound rate) and the number of the of articles that are transported from the ASRS within the time interval (e.g. actual article outbound rate). In some embodiments, the actual throughput rate may be calculated by a controller device based on adding the actual article inbound rate and the actual article outbound rate.

In some embodiments, the throughput data comprises the expected throughput rate. In some embodiments, the expected throughput rate indicates at least one of an expected article inbound rate associated with the ASRS or an expected article outbound rate associated with the ASRS. As described above, the WES may receive order fulfillment data that indicates one or more articles that to be transported to the ASRS, and may determine the expected article inbound rate based at least in part on the order fulfillment data. Additionally, or alternatively, the WES may receive order fulfillment data that indicates one or more articles that to be transported from the ASRS, and may determine the expected article outbound rate based at least in part on the order fulfillment data. In some embodiments, the expected throughput rate may be calculated by a controller device based on adding the expected article inbound rate and the expected article outbound rate.

Referring back to FIG. 7, subsequent to step/operation 703, the example method 700 proceeds to step/operation 705. At step/operation 705, a controller device (such as, but not limited to, the WES and/or one of the controllers described herein in connection with at least FIG. 5 and FIG. 6) retrieves at least one throughput range associated with the ASRS.

In some embodiments, each of the at least one throughput range comprises an upper throughput limit associated with the ASRS and a lower throughput limit associated with the ASRS. As described above, the upper throughput limit indicates a ceiling throughput rate and the lower throughput limit indicates floor throughput rate.

In some embodiments, the controller device may retrieve the at least one throughput range from a data storage device that is internal to the ASRS. In some embodiments, the controller device may retrieve the at least one throughput range from a data storage device that is external to the ASRS.

Referring back to FIG. 7, subsequent to step/operation 705, the example method 700 proceeds to step/operation 707. At step/operation 707, a controller device (such as, but not limited to, the WES and/or one of the controllers described herein in connection with at least FIG. 5 and FIG. 6) adjusts at least one speed setting of at least one article transport device of the ASRS.

In some embodiments, the controller device adjusts at least one speed setting of at least one article transport device of the ASRS based at least in part on the throughput data and the at least one throughput range.

For example, based on whether the actual throughput rate indicates by the throughput data is below, within, or above the at least one throughput range, the controller device may decrease the speed setting of the at least one article transport device (e.g. vertical transport device(s), MDR device(s), and/or horizontal transport device(s)) in the ASRS, maintain the speed setting of the at least one article transport device (e.g. vertical transport device(s), MDR device(s), and/or horizontal transport device(s)) in the ASRS, or increase the speed setting of the at least one article transport device (e.g. vertical transport device(s), MDR device(s), and/or horizontal transport device(s)) in the ASRS, details of which are described in connection with at least FIG. 8.

Additionally, or alternatively, based on whether the expected throughput rate indicates by the throughput data is below, within, or above the at least one throughput range, the controller device may decrease the speed setting of the at least one article transport device (e.g. vertical transport device(s), MDR device(s), and/or horizontal transport device(s)) in the ASRS, maintain the speed setting of the at least one article transport device (e.g. vertical transport device(s), MDR device(s), and/or horizontal transport device(s)) in the ASRS, or increase the speed setting of the at least one article transport device (e.g. vertical transport device(s), MDR device(s), and/or horizontal transport device(s)) in the ASRS, details of which are described in connection with at least FIG. 8.

Referring back to FIG. 7, subsequent to step/operation 707, the example method 700 proceeds to step/operation 709 and ends.

Figure 8:
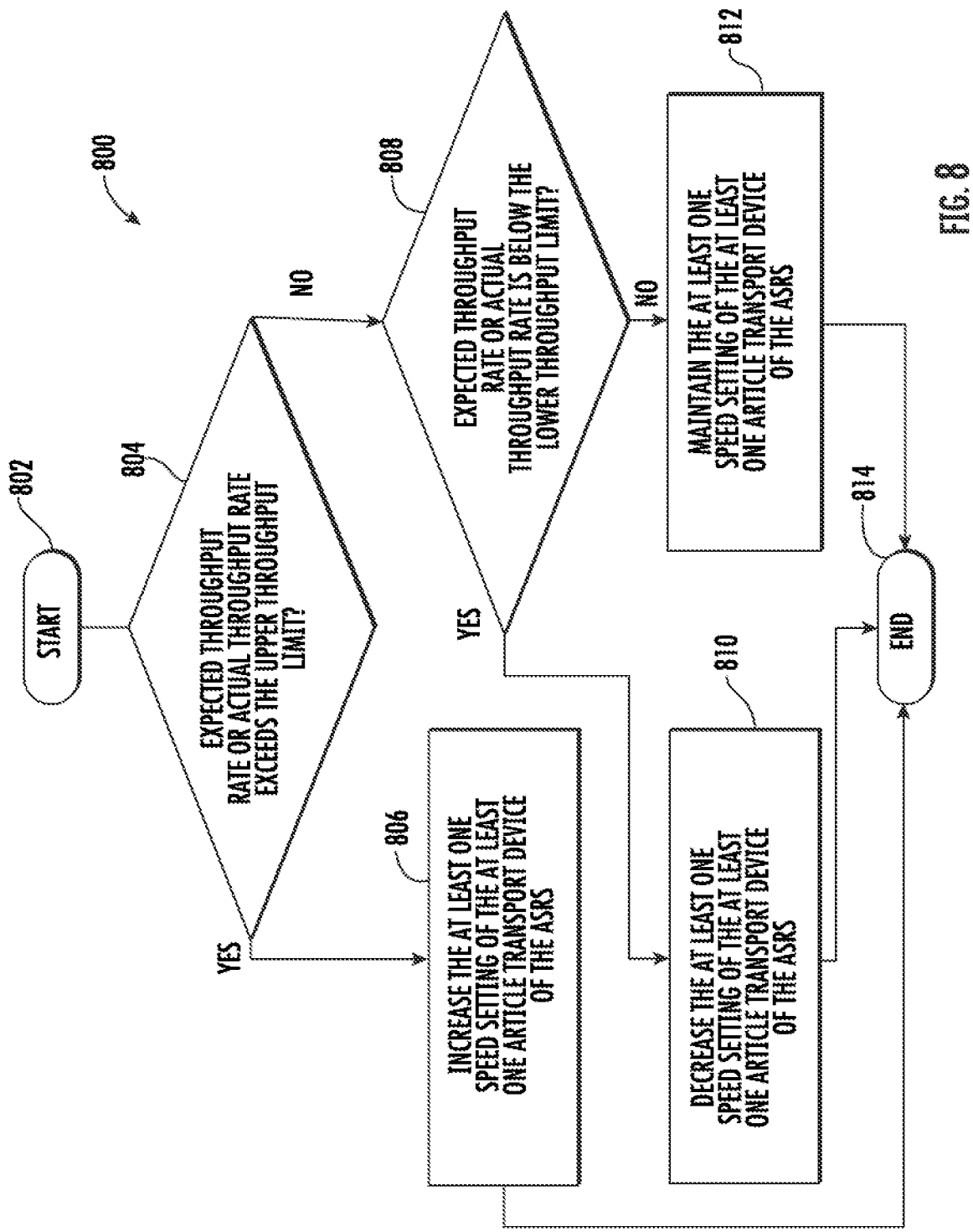
FIG. 8 is an example flow diagram illustrating an example method of adjusting an example speed setting of an example article transport device of an example ASRS in accordance with some example embodiments described herein.

Referring now to FIG. 8, an example method 800 of adjusting an example speed setting of an example article transport device of an example ASRS in accordance with embodiments of the present disclosure is illustrated. For example, the example method 800 illustrates increasing the at least one speed setting of the at least one article transport device of the ASRS in response to determining that the expected throughput rate or the actual throughput rate exceeds the upper throughput limit, and decreasing the at least one speed setting of the at least one article transport device of the ASRS in response to determining that the expected throughput rate or the actual throughput rate is below the lower throughput limit. As such, the example method 800 overcomes various technical challenges.

As shown in FIG. 8, the example method 800 starts at step/operation 802. Subsequent to and/or in response to step/operation 802, the example method 800 proceeds to step/operation 804. At step/operation 804, a controller device (such as, but not limited to, the WES and/or one of the controllers described herein in connection with at least FIG. 5 and FIG. 6) determines whether the expected throughput rate or the actual throughput rate exceeds an upper throughput limit of a throughput range.

As an example, the upper throughput limit of the throughput range may be 20 articles per minute.

If the expected throughput rate is 10 articles per minute, the controller device determines that expected throughput rate does not exceed the upper throughput limit of the throughput range, and the method 800 proceeds to step/operation 808. If the expected throughput rate is 25 articles per minute, the controller device determines that expected throughput rate exceeds the upper throughput limit of the throughput range, and the method 800 proceeds to step/operation 806.

Similarly, if the actual throughput rate is 10 articles per minute, the controller device determines that actual throughput rate does not exceed the upper throughput limit of the throughput range, and the method 800 proceeds to step/operation 808. If the actual throughput rate is 25 articles per minute, the controller device determines that actual throughput rate exceeds the upper throughput limit of the throughput range, and the method 800 proceeds to step/operation 806.

Referring back to FIG. 8, if, at step/operation 804, the processing circuitry determines that the expected throughput rate or actual throughput rate exceeds the upper throughput limit, the example method 800 proceeds to step/operation 806. At step/operation 806, a controller device (such as, but not limited to, the WES and/or one of the controllers described herein in connection with at least FIG. 5 and FIG. 6) increases the at least one speed setting of the at least one article transport device of the ASRS.

Continuing from the example above, if the expected throughput rate is 25 articles per minute and the upper throughput limit of the throughput range is 20 articles per minute, the controller device increases the at least one speed setting of the at least one article transport device of the ASRS, so as to increase the speed of transporting the articles to handle an expected increase of articles, therefore providing sufficient output.

Similarly, if the actual throughput rate is 25 articles per minute and the upper throughput limit of the throughput range is 20 articles per minute, the controller device increases the at least one speed setting of the at least one article transport device of the ASRS, so as to increase the speed of transporting the articles to handle a current increase of articles, therefore providing sufficient output.

Referring back to FIG. 8, if, at step/operation 804, the processing circuitry determines that the expected throughput rate or actual throughput rate does not exceed the upper throughput limit, the example method 800 proceeds to step/operation 808. At step/operation 808, a controller device (such as, but not limited to, the WES and/or one of the controllers described herein in connection with at least FIG. 5 and FIG. 6) determines whether the expected throughput rate or actual throughput rate is below the lower throughput limit.

As an example, the lower throughput limit of the throughput range may be 15 articles per minute.

If the expected throughput rate is 10 articles per minute, the controller device determines that expected throughput rate is below the lower throughput limit of the throughput range, and the method 800 proceeds to step/operation 810. If the expected throughput rate is 20 articles per minute, the controller device determines that expected throughput rate is not below the lower throughput limit of the throughput range, and the method 800 proceeds to step/operation 812.

Similarly, if the actual throughput rate is 10 articles per minute, the controller device determines that actual throughput rate is below the lower throughput limit of the throughput range, and the method 800 proceeds to step/operation 810. If the actual throughput rate is 20 articles per minute, the controller device determines that actual throughput rate is not below the lower throughput limit of the throughput range, and the method 800 proceeds to step/operation 812.

Referring back to FIG. 8, if, at step/operation 808, the processing circuitry determines that the expected throughput rate or actual throughput rate is below the lower throughput limit, the example method 800 proceeds to step/operation 810. At step/operation 810, a controller device (such as, but not limited to, the WES and/or one of the controllers described herein in connection with at least FIG. 5 and FIG. 6) decreases the at least one speed setting of the at least one article transport device of the ASRS.

Continuing from the example above, if the expected throughput rate is 10 articles per minute and the lower throughput limit of the throughput range is 15 articles per minute, the controller device decreases the at least one speed setting of the at least one article transport device of the ASRS, so as to decrease the speed of transporting the articles to avoid excessive wear and tear on the article transport devices.

Similarly, if the actual throughput rate is 10 articles per minute and the lower throughput limit of the throughput range is 15 articles per minute, the controller device decreases the at least one speed setting of the at least one article transport device of the ASRS, so as to decrease the speed of transporting the articles to avoid excessive wear and tear on the article transport devices.

If, at step/operation 808, the processing circuitry determines that the expected throughput rate or actual throughput rate is not below the lower throughput limit, the example method 800 proceeds to step/operation 812. At step/operation 812, a controller device (such as, but not limited to, the WES and/or one of the controllers described herein in connection with at least FIG. 5 and FIG. 6) maintains the at least one speed setting of the at least one article transport device of the ASRS.

For example, if the expected throughput rate is 18 articles per minute and the throughput range is between 15 articles per minute (e.g. the lower throughput limit) and 20 articles per minute (e.g. the upper throughput limit), the expected throughput rate is within the throughput range (e.g. not exceeding the upper throughput limit and not being below the lower throughput limit). The controller device may maintain the at least one speed setting of the at least one article transport device of the ASRS so as to balance providing sufficient output and avoiding excessive wear and tear on the article transport devices.

Similarly, if the actual throughput rate is 18 articles per minute and the throughput range is between 15 articles per minute (e.g. the lower throughput limit) and 20 articles per minute (e.g. the upper throughput limit), the actual throughput rate is within the throughput range (e.g. not exceeding the upper throughput limit and not being below the lower throughput limit). The controller device may maintain the at least one speed setting of the at least one article transport device of the ASRS so as to balance providing sufficient output and avoiding excessive wear and tear on the article transport devices.

Referring back to FIG. 8, subsequent to and/or in response to step/operation 806, step/operation 810, and/or step/operation 812, the example method 800 proceeds to step/operation 814 and ends.

Figure 9:
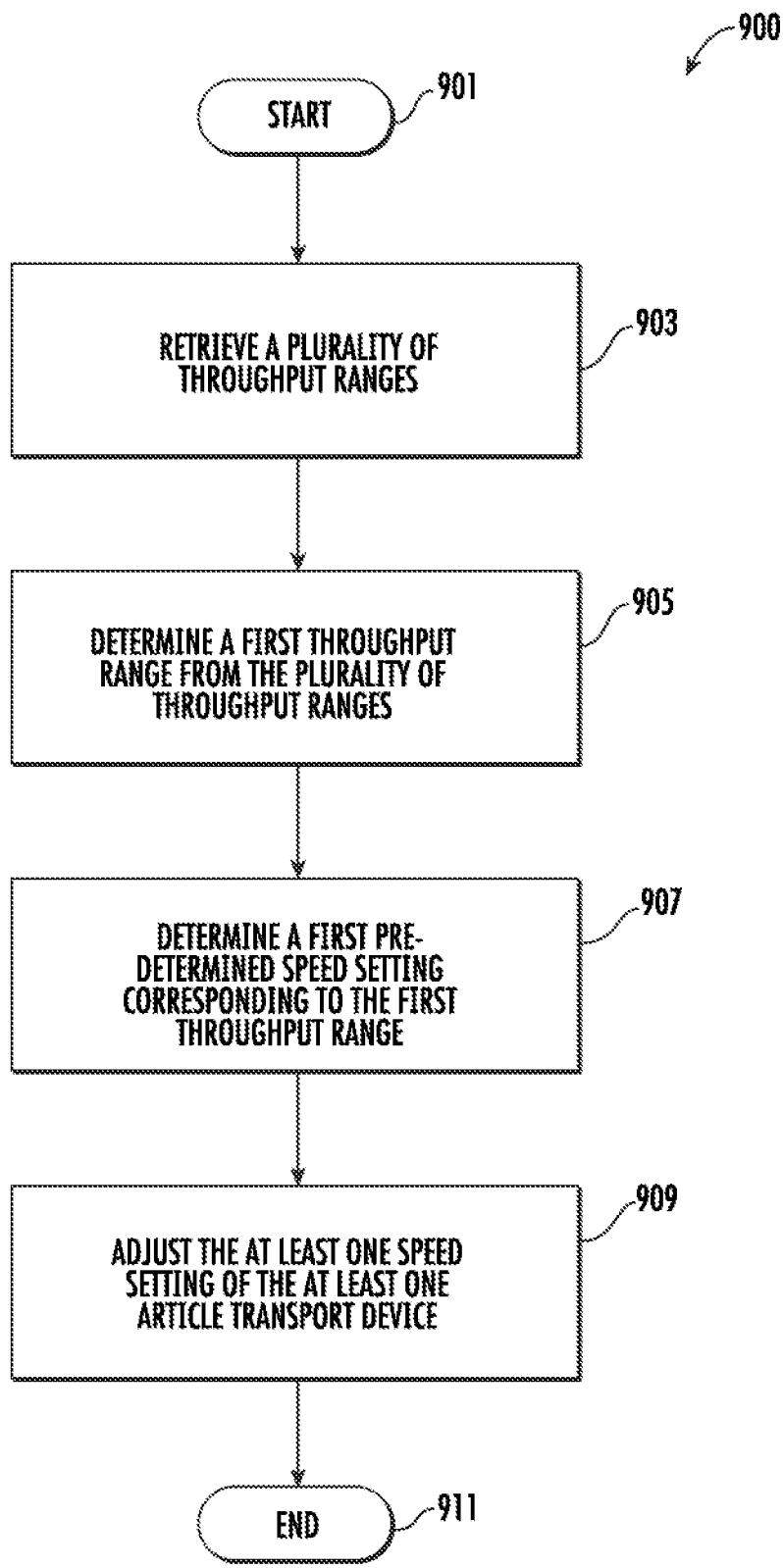
FIG. 9 is an example flow diagram illustrating an example method of adjusting an example speed setting of an example article transport device of an example ASRS in accordance with some example embodiments described herein.

Referring now to FIG. 9, an example method 900 of adjusting an example speed setting of article transport devices of an example ASRS in accordance with embodiments of the present disclosure is illustrated. For example, the example method 900 dynamically adjusts the speeding settings of article transport devices based on which throughput range that the expected throughput rate or the actual throughput rate falls into. As such, the example method 900 overcomes various technical challenges.

As shown in FIG. 9, the example method 900 starts at step/operation 901. Subsequent to and/or in response to step/operation 901, the example method 900 proceeds to step/operation 903. At step/operation 903, a controller device (such as, but not limited to, the WES and/or one of the controllers described herein in connection with at least FIG. 5 and FIG. 6) retrieves a plurality of throughput ranges associated with the ASRS.

In some embodiments, each of the plurality of throughput ranges is associated with a predetermined speed setting of at least one article transport device of the ASRS.

As an example, the plurality of throughput ranges may include a first throughput range between 10 articles per minute and 20 articles per minute, and a second throughput range between 21 articles per minute and 30 articles per minute. The first throughput range is associated with a first predetermined speed setting and the second throughput range is associated with a second predetermined speed setting.

In some embodiments, the controller device may retrieve the plurality of throughput ranges from a data storage device that is internal to the ASRS. In some embodiments, the controller device may retrieve the plurality of throughput ranges from a data storage device that is external to the ASRS.

Subsequent to and/or in response to step/operation 903, the example method 900 proceeds to step/operation 905. At step/operation 905, a controller device (such as, but not limited to, the WES and/or one of the controllers described herein in connection with at least FIG. 5 and FIG. 6) determines a first throughput range from the plurality of throughput ranges.

In some embodiments, to determine the first throughput range, the controller device may determine the expected throughput rate or the actual throughput rate of the ASRS, similar to various examples described herein. In some embodiments, the controller device determines the first throughput range based on the expected throughput rate or the actual throughput rate being within the first throughput range.

Continuing from the example above, the controller device may determine that the expected throughput rate is 15 articles per minute, and may determine/select the first throughput range (not the second throughput range) from the plurality of throughput ranges. Similarly, the controller device may determine that the actual throughput rate is 15 articles per minute, and may determine/select the first throughput range (not the second throughput range) from the plurality of throughput ranges.

Subsequent to and/or in response to step/operation 905, the example method 900 proceeds to step/operation 907. At step/operation 907, a controller device (such as, but not limited to, the WES and/or one of the controllers described herein in connection with at least FIG. 5 and FIG. 6) determines a first predetermined speed setting corresponding to the first throughput range.

Continuing from the example above, subsequent to the controller device determining/selecting the first throughput range, the controller device determines the first predetermined speed setting of at least one article transport device associated with the ASRS that corresponds to the first throughput range.

Subsequent to and/or in response to step/operation 907, the example method 900 proceeds to step/operation 909. At step/operation 909, a controller device (such as, but not limited to, the WES and/or one of the controllers described herein in connection with at least FIG. 5 and FIG. 6) adjusts the at least one speed setting of the at least one article transport device.

In some embodiments, the controller device adjusts the at least one speed setting of the at least one article transport device based at least in part on the first predetermined speed setting. For example, the first predetermined speed setting may indicate speed(s) of motor(s) for vertical transport device(s), MDR device(s), and/or horizontal transport device(s). In such an example, the controller device adjusts the speed of the motor to the first predetermined speed setting.

Subsequent to and/or in response to step/operation 909, the example method 900 proceeds to step/operation 911 and ends.

Figure 10:
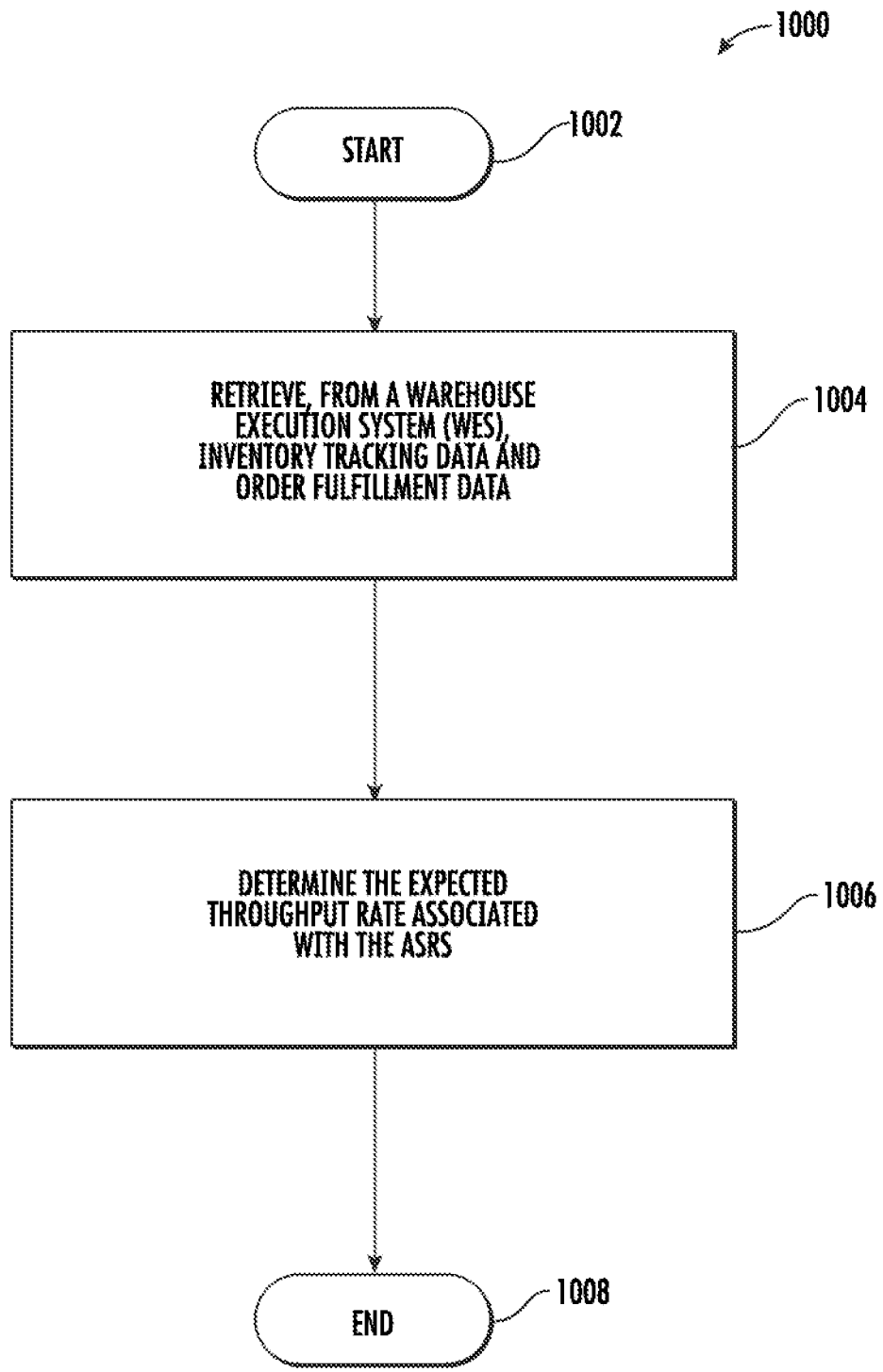
FIG. 10 is an example flow diagram illustrating an example method of determining an example expected throughput rate associated with an example ASRS in accordance with some example embodiments described herein.

Referring now to FIG. 10, an example method 1000 of an example expected throughput algorithm in accordance with embodiments of the present disclosure is illustrated. For example, the example method 1000 determines an example expected throughput rate associated with an example ASRS based at least in part on inventory tracking data and/or order fulfillment data. As such, the example method 1000 overcomes various technical challenges.

As shown in FIG. 10, the example method 1000 starts at step/operation 1002. Subsequent to and/or in response to step/operation 1002, the example method 1000 proceeds to step/operation 1004. At step/operation 1004, a controller device (such as, but not limited to, the WES described herein in connection with at least FIG. 5 and FIG. 6) retrieves inventory tracking data and order fulfillment data from a WES.

As described above, the inventory tracking data indicates the actual storage locations of various articles stored in the ASRS (for example, but not limited to, which storage rack and/or which storage level that the article is stored), and the order fulfillment data indicates the one or more articles that to be transported to the ASRS and/or one or more articles to be transported from the ASRS.

Subsequent to and/or in response to step/operation 1004, the example method 1000 proceeds to step/operation 1006. At step/operation 1006, a controller device (such as, but not limited to, the WES described herein in connection with at least FIG. 5 and FIG. 6) determines the expected throughput rate associated with the ASRS.

In some embodiments, the controller device determines the expected throughput rate associated with the ASRS based at least in part on the inventory tracking data and/or order fulfillment data.

For example, the controller device may determine, based on the order fulfillment data, the amount of articles to be transported to and/or from the ASRS within a time period (for example, the next 60 minutes). The controller device may divide the amount of articles by the time period to determine the expected throughput rate.

Additionally, or alternatively, the controller device may calculate a device-specific expected throughput rate associated with an article transport device. For example, based on the order fulfillment data (and the inventory tracking data), the controller device determines the storage locations of articles to be retrieved from the ASRS, and/or destination storage locations of articles to be transported to the ASRS for storage. For example, the controller device may determine the storage rack(s) and/or the storage level(s) of these storage locations and destination storage locations. The controller device may retrieve assignment data to determine which article transport device(s) are assigned to handle these storage locations and destination storage locations, and calculate the device-specific expected throughput rate based at least in part on the assignment data. Additional details are described in connection with at least FIG. 12, FIG. 14, and FIG. 16.

Subsequent to and/or in response to step/operation 1006, the example method 1000 proceeds to step/operation 1008 and ends.

Figure 11:
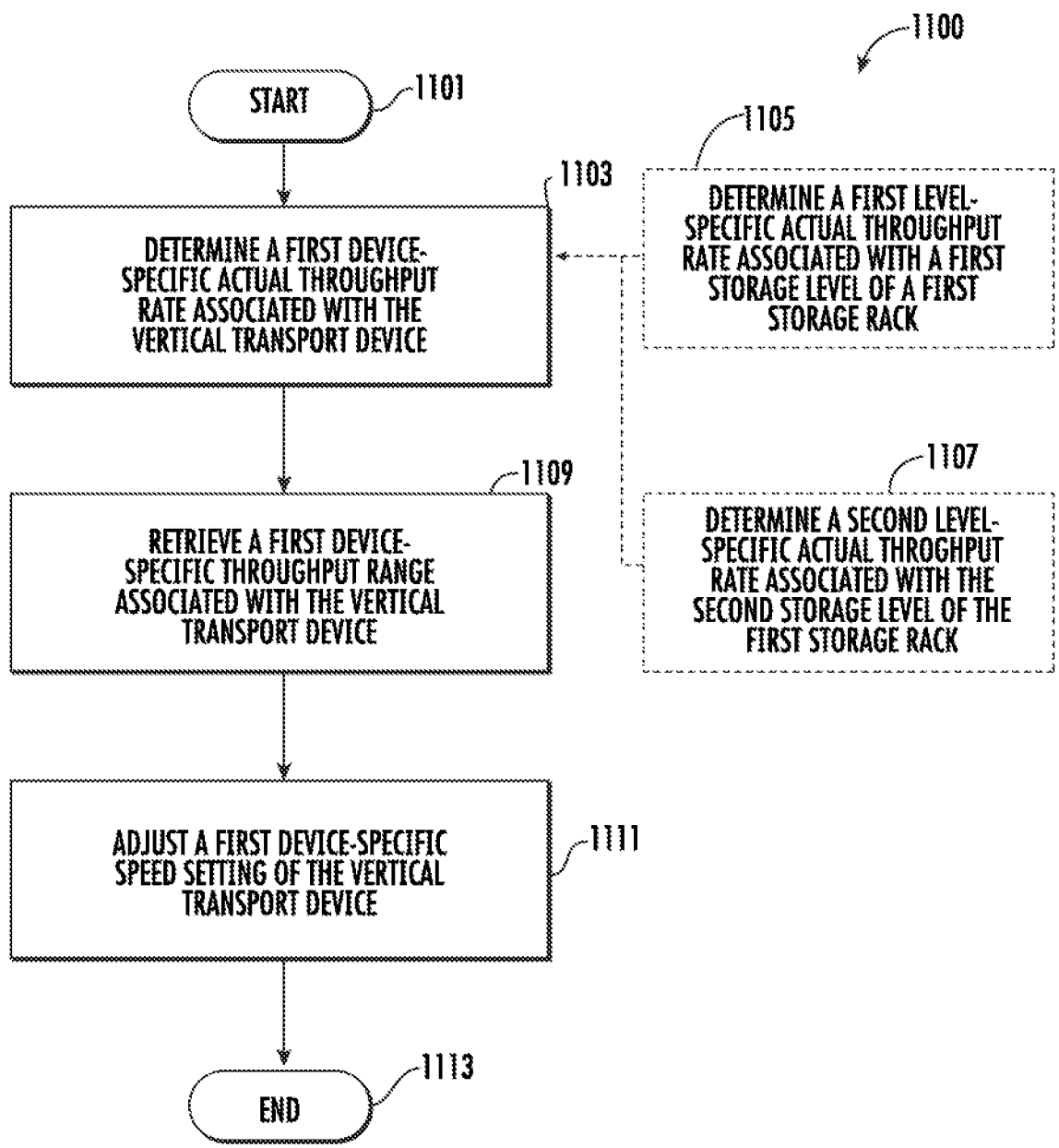
FIG. 11 is an example flow diagram illustrating an example method of adjusting an example device-specific speed setting of an example vertical transport device in accordance with some example embodiments described herein.

Referring now to FIG. 11, an example method 1100 of adjusting an example device-specific speed setting of an example vertical transport device in accordance with embodiments of the present disclosure is illustrated. For example, the example method 1100 adjusts the speed setting of the vertical transport device based on determining the device-specific actual throughput rate associated with the vertical transport device and determining the device-specific throughput range associated with the vertical transport device. As such, the example method 1100 overcomes various technical challenges.

As shown in FIG. 11, the example method 1100 starts at step/operation 1101. Subsequent to and/or in response to step/operation 1101, the example method 1100 proceeds to step/operation 1103. At step/operation 1103, a controller device (such as, but not limited to, the WES and/or one of the vertical transport device controllers described herein in connection with at least FIG. 5 and FIG. 6) determines a first device-specific actual throughput rate associated with the vertical transport device.

In some embodiments, the first device-specific actual throughput rate may be determined by the vertical transport device controller associated with the vertical transport device. For example, the vertical transport device may comprise one or more sensors for tracking articles, and the vertical transport device controller may keep track of the number of articles handled by the vertical transport device within a time interval, and may determine the device-specific actual throughput rate associated with the vertical transport device.

While the description above provides an example of using a device controller to determine the device-specific actual throughput rate associated with the vertical transport device, it is noted that the scope of the present disclosure is not limited to the description above. In some examples, an example method may utilize the WES to determine the device-specific actual throughput rate associated with the vertical transport device.

As described above, the vertical transport device assignment data indicates which storage rack(s) and/or which storage level(s) that one vertical transport device is configured to convey articles to and/or from. As such, in some embodiments, a controller device (such as, but not limited to, the WES described herein in connection with at least FIG. 5 and FIG. 6) may first retrieve vertical transport device assignment data, and determine level-specific actual throughput rate(s) of storage level(s) indicated in the vertical transport device assignment data based on recorded actual throughput rate(s) and/or rack-specific actual throughput rate(s) of storage rack(s) indicated in the vertical transport device assignment data based on recorded actual throughput rate(s).

For the purpose of illustration in FIG. 11, the vertical transport device is associated with a first storage level and a second storage level from the plurality of storage levels, and the first storage level and the second storage level are associated with a first storage rack of the plurality of storage racks. However, it is noted that the scope of the present disclosure is not limited to this example only.

For example, at step/operation 1105, a controller device (such as, but not limited to, the WES described herein in connection with at least FIG. 5 and FIG. 6) determines a first level-specific actual throughput rate associated with a first storage level of a first storage rack based on recorded actual throughput rate(s).

Continuing from the example above, at step/operation 1107, a controller device (such as, but not limited to, the WES and/or one of the vertical transport device controllers described herein in connection with at least FIG. 5 and FIG. 6) determines a second level-specific actual throughput rate associated with the second storage level of the first storage rack based on recorded actual throughput rate(s).

In some embodiments, the controller device calculates the first device-specific actual throughput rate associated with the vertical transport device based at least in part on the first level-specific actual throughput rate and the second level-specific actual throughput rate. For example, the controller device combines the first level-specific actual throughput rate and the second level-specific actual throughput rate to determine the first device-specific actual throughput rate associated with the vertical transport device.

Subsequent to and/or in response to step/operation 1103, the example method 1100 proceeds to step/operation 1109. At step/operation 1109, a controller device (such as, but not limited to, the WES and/or one of the vertical transport device controllers described herein in connection with at least FIG. 5 and FIG. 6) retrieves a first device-specific throughput range associated with the vertical transport device.

In some embodiments, the device-specific throughput range may indicate a throughput range that is predetermined specifically for the vertical transport device. In some embodiments, the device-specific throughput range may correspond to a predetermined speed setting, similar to various examples described herein.

Subsequent to and/or in response to step/operation 1109, the example method 1100 proceeds to step/operation 1111. At step/operation 1111, a controller device (such as, but not limited to, the WES and/or one of the vertical transport device controllers described herein in connection with at least FIG. 5 and FIG. 6) adjusts a first device-specific speed setting of the vertical transport device.

In some embodiments, the controller device adjusts the first device-specific speed setting of the vertical transport device based at least in part on the first device-specific actual throughput rate and the first device-specific throughput range. For example, the controller device adjusts the motor speed of the vertical transport device based on the first device-specific actual throughput rate and the first device-specific throughput range, similar to various examples described herein in connection with at least FIG. 7 to FIG. 9.

Subsequent to and/or in response to step/operation 1111, the example method 1100 proceeds to step/operation 1113 and ends.

Figure 12:
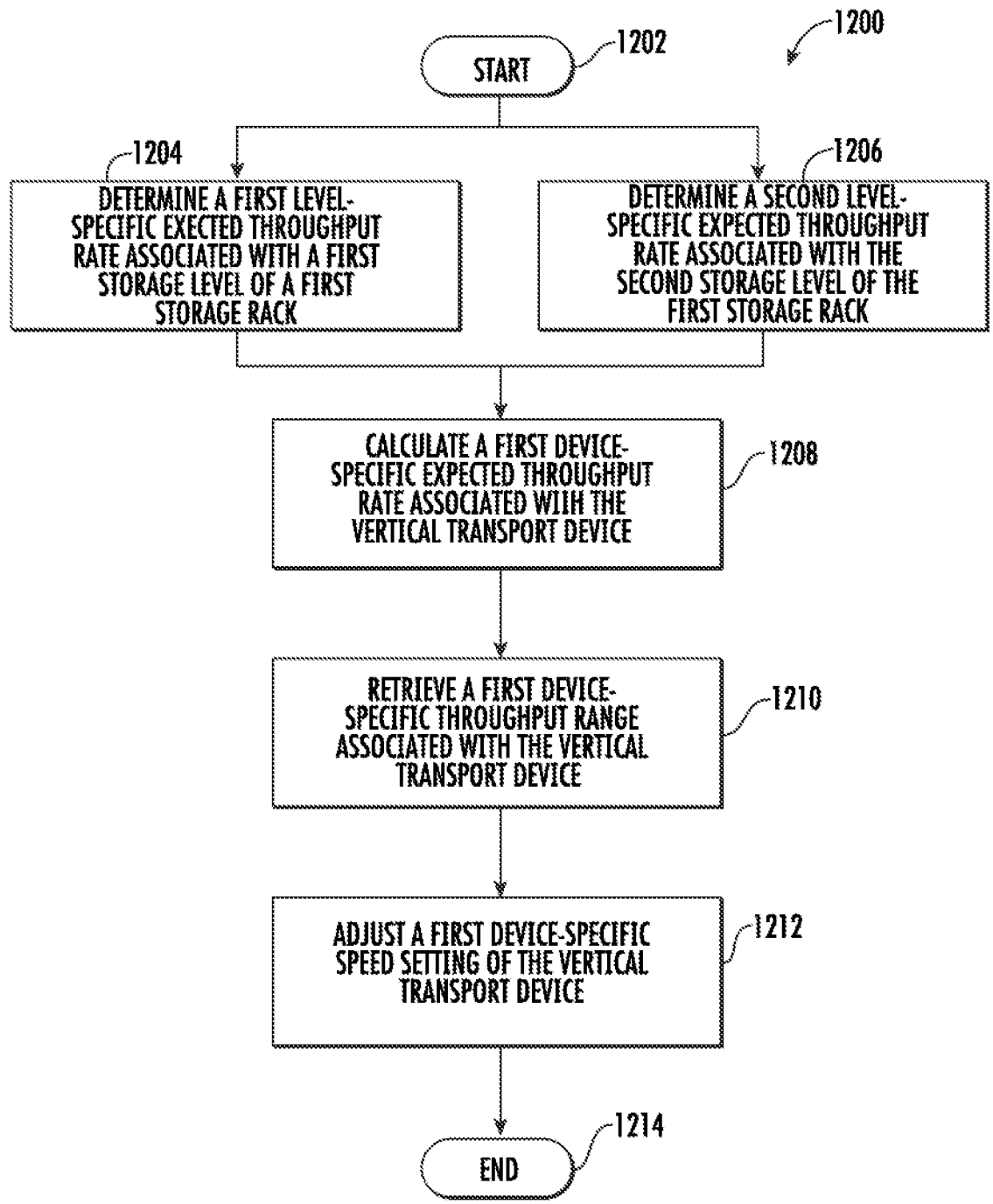
FIG. 12 is an example flow diagram illustrating an example method of adjusting an example device-specific speed setting of an example vertical transport device in accordance with some example embodiments described herein.

Referring now to FIG. 12, an example method 1200 of adjusting an example device-specific speed setting of an example vertical transport device in accordance with embodiments of the present disclosure is illustrated. For example, the example method 1200 adjusts the speed setting of the vertical transport device based on calculating the device-specific expected throughput rate associated with the vertical transport device and determining the device-specific throughput range associated with the vertical transport device. As such, the example method 1200 overcomes various technical challenges.

As shown in FIG. 12, the example method 1200 starts at step/operation 1202.

As described above, the vertical transport device assignment data indicates which storage rack(s) and/or which storage level(s) that one vertical transport device is configured to convey articles to and/or from. As such, in some embodiments, a controller device (such as, but not limited to, the WES described herein in connection with at least FIG. 5 and FIG. 6) may first retrieve vertical transport device assignment data, and determine level-specific expected throughput rate(s) of storage level(s) indicated in the vertical transport device assignment data and/or rack-specific expected throughput rate(s) of storage rack(s) indicated in the vertical transport device assignment data.

For the purpose of illustration in FIG. 12, the vertical transport device is associated with a first storage level and a second storage level from the plurality of storage levels, and the first storage level and the second storage level are associated with a first storage rack of the plurality of storage racks. However, it is noted that the scope of the present disclosure is not limited to this example only.

Referring back to FIG. 12, subsequent to and/or in response to step/operation 1202, the example method 1200 proceeds to step/operation 1204. At step/operation 1204, a controller device (such as, but not limited to, the WES described herein in connection with at least FIG. 5 and FIG. 6) determines a first level-specific expected throughput rate associated with a first storage level of a first storage rack.

For example, based on the order fulfillment data (and the inventory tracking data), the controller device determines the articles (and the number of these articles) to be transported to and/or from the first storage level of a first storage rack over a time period. The controller device may divide the amount of articles by the time period to determine the first level-specific expected throughput rate, similar to those described in connection with at least FIG. 10.

Subsequent to and/or in response to step/operation 1202, the example method 1200 proceeds to step/operation 1206. At step/operation 1206, a controller device (such as, but not limited to, the WES described herein in connection with at least FIG. 5 and FIG. 6) determines a second level-specific expected throughput rate associated with the second storage level of the first storage rack.

For example, based on the order fulfillment data (and the inventory tracking data), the controller device determines the articles (and the number of these articles) to be transported to and/or from the second storage level of the first storage rack over a time period. The controller device may divide the amount of articles by the time period to determine the second level-specific expected throughput rate, similar to those described in connection with at least FIG. 10.

Subsequent to and/or in response to step/operation 1204 and/or step/operation 1206, the example method 1200 proceeds to step/operation 1208. At step/operation 1208, a controller device (such as, but not limited to, the WES described herein in connection with at least FIG. 5 and FIG. 6) calculates a first device-specific expected throughput rate associated with the vertical transport device.

In some embodiments, the controller device calculates the first device-specific expected throughput rate associated with the vertical transport device based at least in part on the first level-specific expected throughput rate and the second level-specific expected throughput rate. For example, the controller device combines the first level-specific expected throughput rate and the second level-specific expected throughput rate to determine the first device-specific expected throughput rate associated with the vertical transport device.

Subsequent to and/or in response to step/operation 1208, the example method 1200 proceeds to step/operation 1210. At step/operation 1210, a controller device (such as, but not limited to, the WES described herein in connection with at least FIG. 5 and FIG. 6) retrieves a first device-specific throughput range associated with the vertical transport device.

In some embodiments, the device-specific throughput range may indicate a throughput range that is predetermined specifically for the vertical transport device. In some embodiments, the device-specific throughput range may correspond to a predetermined speed setting, similar to various examples described herein.

Subsequent to and/or in response to step/operation 1210, the example method 1200 proceeds to step/operation 1212. At step/operation 1212, a controller device (such as, but not limited to, the WES described herein in connection with at least FIG. 5 and FIG. 6) adjusts a first device-specific speed setting of the vertical transport device.

In some embodiments, the controller device adjusts the first device-specific speed setting of the vertical transport device based at least in part on the first device-specific expected throughput rate and the first device-specific throughput range (for example, a relationship between the first device-specific expected throughput rate and the first device-specific throughput range). For example, the controller device adjusts the motor speed of the vertical transport device based on the first device-specific expected throughput rate and the first device-specific throughput range, similar to various examples described herein in connection with at least FIG. 7 to FIG. 9.

Subsequent to and/or in response to step/operation 1212 the example method 1200 proceeds to step/operation 1214 and ends.

Figure 13:
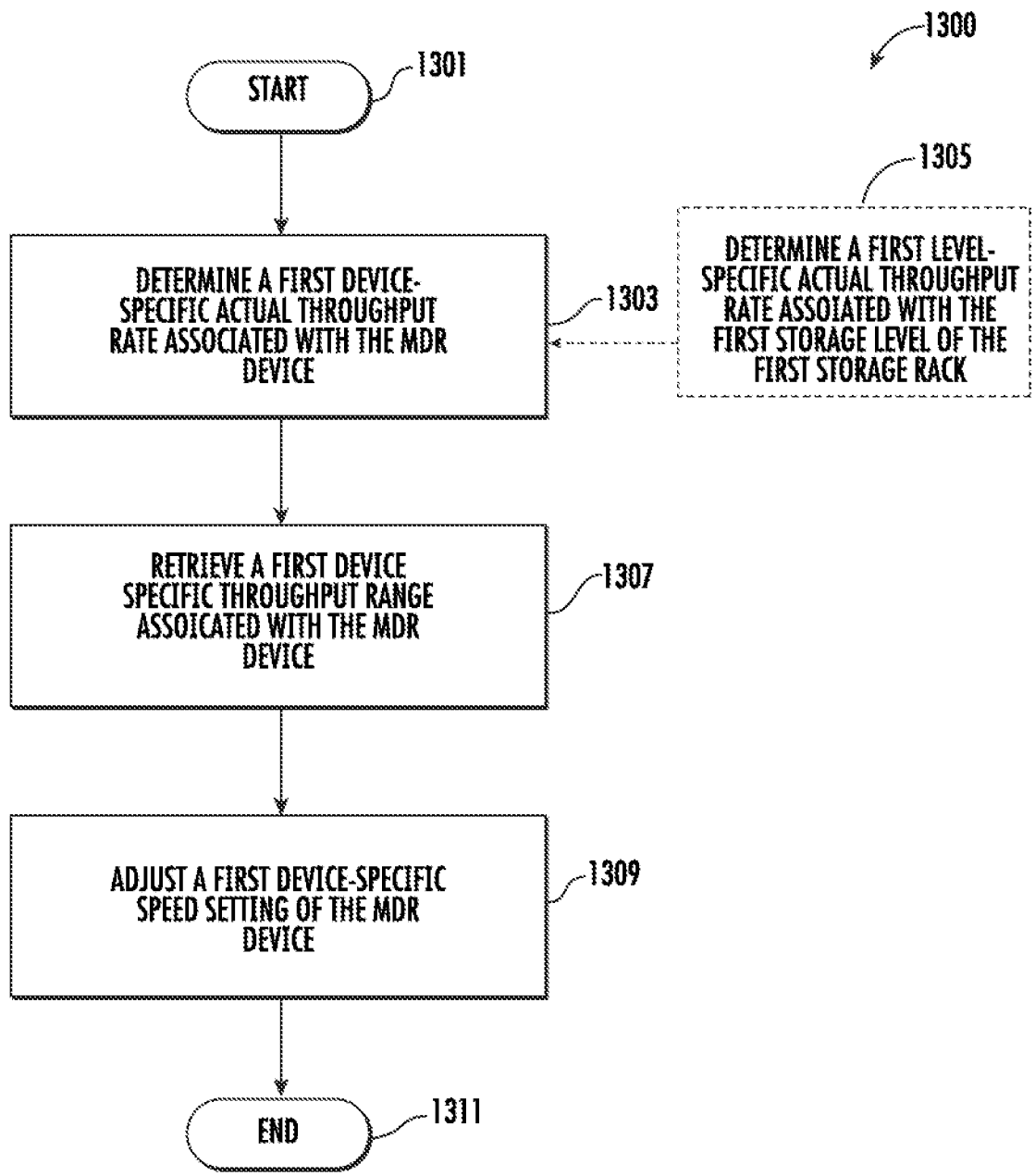
FIG. 13 is an example flow diagram illustrating an example method of adjusting an example device-specific speed setting of an example motor driven roller (MDR) device in accordance with some example embodiments described herein.

Referring now to FIG. 13, an example method 1300 of adjusting an example device-specific speed setting of an example MDR device in accordance with embodiments of the present disclosure is illustrated. For example, the example method 1300 adjusts the speed setting of the MDR device based on determining the device-specific actual throughput rate associated with the MDR device and determining the device-specific throughput range associated with the MDR device. As such, the example method 1300 overcomes various technical challenges.

As shown in FIG. 13, the example method 1300 starts at step/operation 1301. Subsequent to and/or in response to step/operation 1301, the example method 1300 proceeds to step/operation 1303. At step/operation 1303, a controller device (such as, but not limited to, the WES and/or one of the MDR device controllers described herein in connection with at least FIG. 5 and FIG. 6) determines a first device-specific actual throughput rate associated with the MDR device.

In some embodiments, the first device-specific actual throughput rate may be determined by the MDR device controller associated with the MDR device. For example, the MDR device may comprise one or more sensors for tracking articles, and the MDR device controller may keep track of the number of articles within a time interval, and may determine the device-specific actual throughput rate associated with the MDR device.

While the description above provides an example of using a device controller to determine the device-specific actual throughput rate associated with the MDR device, it is noted that the scope of the present disclosure is not limited to the description above. In some examples, an example method may utilize the WES to determine the device-specific actual throughput rate associated with the MDR device.

As described above, the MDR device assignment data indicates which storage rack(s) and/or which storage level(s) that one MDR device is configured to convey articles to and/or from. As such, in some embodiments, a controller device (such as, but not limited to, the WES described herein in connection with at least FIG. 5 and FIG. 6) may first retrieve MDR device assignment data, and determine level-specific actual throughput rate(s) of storage level(s) indicated in the MDR device assignment data based on recorded actual throughput rate(s) and/or rack-specific actual throughput rate(s) of storage rack(s) indicated in the MDR device assignment data based on recorded actual throughput rate(s).

For example, the MDR device may be a part of a rack feeding conveyor and the MDR device assignment data is the rack feeding conveyor assignment data associated with the rack feeding conveyor. Additionally, or alternatively, the MDR device may be a part of a level feeding conveyor, and the MDR device assignment data is the level feeding conveyor assignment data associated with the rack feeding conveyor. Additionally, or alternatively, the MDR device may be a part of a vertical transport device, and the MDR device assignment data is the vertical transport device assignment data associated with the vertical transport device.

For the purpose of illustration in FIG. 13, the MDR device is associated with a first storage level from the plurality of storage levels and is associated with a first storage rack of the plurality of storage racks. However, it is noted that the scope of the present disclosure is not limited to this example only.

For example, at step/operation 1305, a controller device (such as, but not limited to, the WES and/or one of the MDR device controllers described herein in connection with at least FIG. 5 and FIG. 6) determines a first level-specific actual throughput rate associated with the first storage level of the first storage rack based on recorded actual throughput rate(s).

In some embodiments, the controller device calculates the first device-specific actual throughput rate associated with the MDR device based at least in part on the first level-specific actual throughput rate. For example, the controller device determines that the first level-specific actual throughput rate is the first device-specific actual throughput rate associated with the MDR device.

Subsequent to and/or in response to step/operation 1303, the example method 1300 proceeds to step/operation 1307.

At step/operation 1307, a controller device (such as, but not limited to, the WES and/or one of the MDR device controllers described herein in connection with at least FIG. 5 and FIG. 6) retrieves a first device-specific throughput range associated with the MDR device.

In some embodiments, the device-specific throughput range may indicate a throughput range that is predetermined specifically for the MDR device. In some embodiments, the device-specific throughput range may correspond to a predetermined speed setting, similar to various examples described herein.

Subsequent to and/or in response to step/operation 1307, the example method 1300 proceeds to step/operation 1309. At step/operation 1309, a controller device (such as, but not limited to, the WES and/or one of the MDR device controllers described herein in connection with at least FIG. 5 and FIG. 6) adjusts a first device-specific speed setting of the MDR device.

In some embodiments, the controller device adjusts the first device-specific speed setting of the MDR device based at least in part on the first device-specific actual throughput rate and the first device-specific throughput range (for example, based on a relationship between the first device-specific actual throughput rate and the first device-specific throughput range). For example, the controller device adjusts the motor speed of the MDR device based on the first device-specific actual throughput rate and the first device-specific throughput range, similar to various examples described herein in connection with at least FIG. 7 to FIG. 9.

Subsequent to and/or in response to step/operation 1309, the example method 1300 proceeds to step/operation 1311 and ends.

Figure 14:
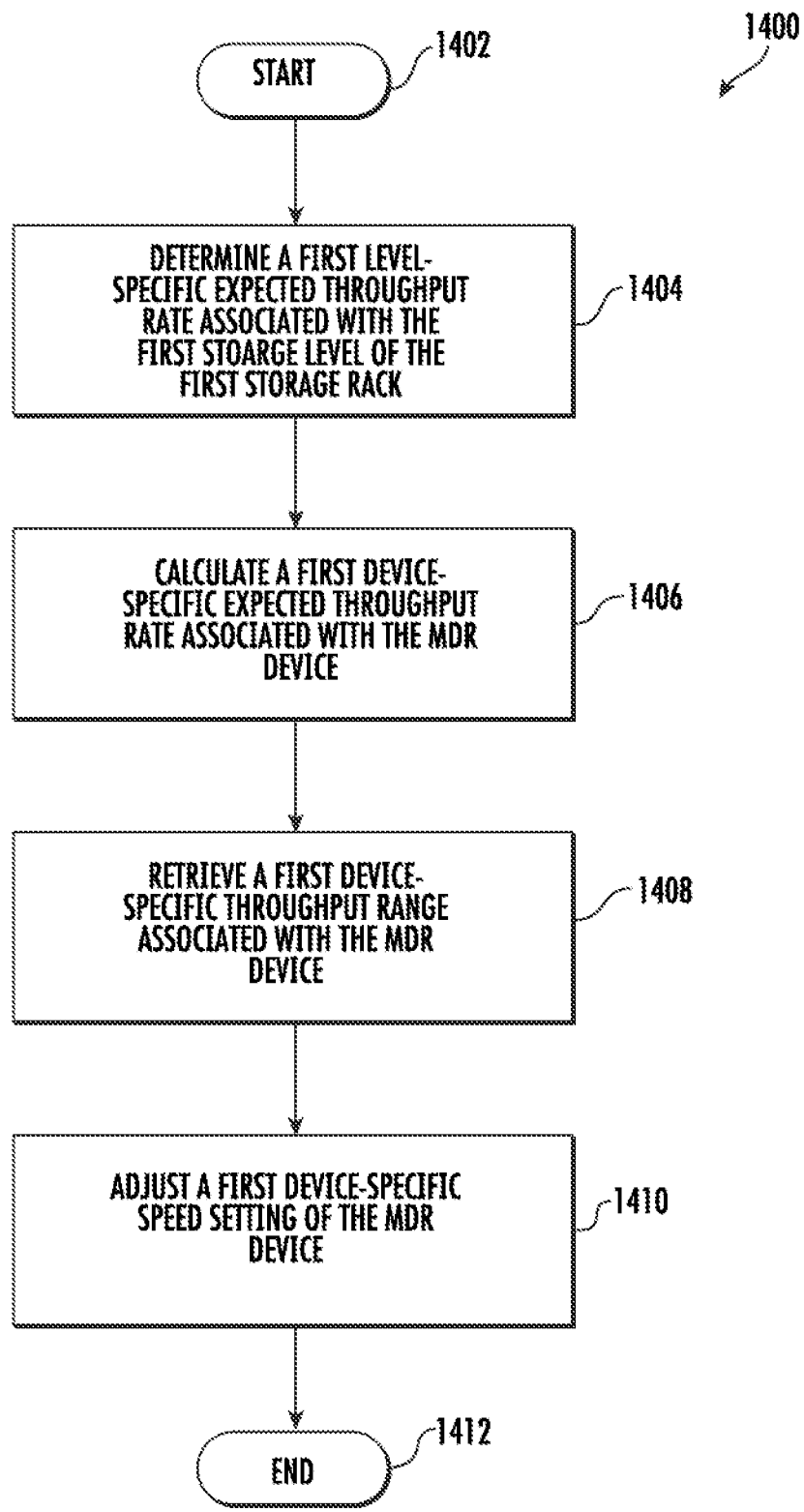
FIG. 14 is an example flow diagram illustrating an example method of adjusting an example device-specific speed setting of an example MDR device in accordance with some example embodiments described herein.

Referring now to FIG. 14, an example method 1400 of adjusting an example device-specific speed setting of an example MDR device in accordance with embodiments of the present disclosure is illustrated. For example, the example method 1400 adjusts the speed setting of the MDR device based on calculating the device-specific expected throughput rate associated with the MDR device and determining the device-specific throughput range associated with the MDR device. As such, the example method 1400 overcomes various technical challenges.

As shown in FIG. 14, the example method 1400 starts at step/operation 1402.

As described above, the MDR device assignment data indicates which storage rack(s) and/or which storage level(s) that one MDR device is configured to convey articles to and/or from. As such, in some embodiments, a controller device (such as, but not limited to, the WES and/or one of the MDR device controllers described herein in connection with at least FIG. 5 and FIG. 6) may first retrieve MDR assignment data, and determine level-specific expected throughput rate(s) of storage level(s) indicated in the MDR device assignment data and/or rack-specific expected throughput rate(s) of storage rack(s) indicated in the MDR device assignment data.

For example, the MDR device may be a part of a rack feeding conveyor and the MDR device assignment data is the rack feeding conveyor assignment data associated with the rack feeding conveyor. Additionally, or alternatively, the MDR device may be a part of a level feeding conveyor, and the MDR device assignment data is the level feeding conveyor assignment data associated with the rack feeding conveyor. Additionally, or alternatively, the MDR device may be a part of a vertical transport device, and the MDR device assignment data is the vertical transport device assignment data associated with the vertical transport device.

For the purpose of illustration in FIG. 14, the MDR device is associated with a first storage level from the plurality of storage levels and is associated with a first storage rack of the plurality of storage racks. However, it is noted that the scope of the present disclosure is not limited to this example only.

Referring back to FIG. 14, subsequent to and/or in response to step/operation 1402, the example method 1400 proceeds to step/operation 1404. At step/operation 1404, a controller device (such as, but not limited to, the WES described herein in connection with at least FIG. 5 and FIG. 6) determines a first level-specific expected throughput rate associated with the first storage level of the first storage rack.

For example, based on the order fulfillment data (and the inventory tracking data), the controller device determines the articles (and the number of these articles) to be transported to and/or from the first storage level of the first storage rack over a time period. The controller device may divide the amount of articles by the time period to determine the first level-specific expected throughput rate, similar to those described in connection with at least FIG. 10.

Subsequent to and/or in response to step/operation 1404, the example method 1400 proceeds to step/operation 1406. At step/operation 1406, a controller device (such as, but not limited to, the WES described herein in connection with at least FIG. 5 and FIG. 6) calculates a first device-specific expected throughput rate associated with the MDR device.

In some embodiments, the controller device calculates the first device-specific expected throughput rate associated with the MDR device based at least in part on the first level-specific expected throughput rate. For example, the controller device determines that the first level-specific expected throughput rate is the first device-specific expected throughput rate associated with the MDR device.

Subsequent to and/or in response to step/operation 1406, the example method 1400 proceeds to step/operation 1408. At step/operation 1408, a controller device (such as, but not limited to, the WES described herein in connection with at least FIG. 5 and FIG. 6) retrieves a first device-specific throughput range associated with the MDR device.

In some embodiments, the device-specific throughput range may indicate a throughput range that is predetermined specifically for the MDR device. In some embodiments, the device-specific throughput range may correspond to a predetermined speed setting, similar to various examples described herein.

Subsequent to and/or in response to step/operation 1408, the example method 1400 proceeds to step/operation 1410. At step/operation 1410, a controller device (such as, but not limited to, the WES described herein in connection with at least FIG. 5 and FIG. 6) adjusts a first device-specific speed setting of the MDR device.

In some embodiments, the controller device adjusts the first device-specific speed setting of the MDR device based at least in part on the first device-specific expected throughput rate and the first device-specific throughput range (for example, based on a relationship between the first device-specific expected throughput rate and the first device-specific throughput range). For example, the controller device adjusts the motor speed of the MDR device based on the first device-specific expected throughput rate and the first device-specific throughput range, similar to various examples described herein in connection with at least FIG. 7 to FIG. 9.

Subsequent to and/or in response to step/operation 1410, the example method 1400 proceeds to step/operation 1412 and ends.

Figure 15:
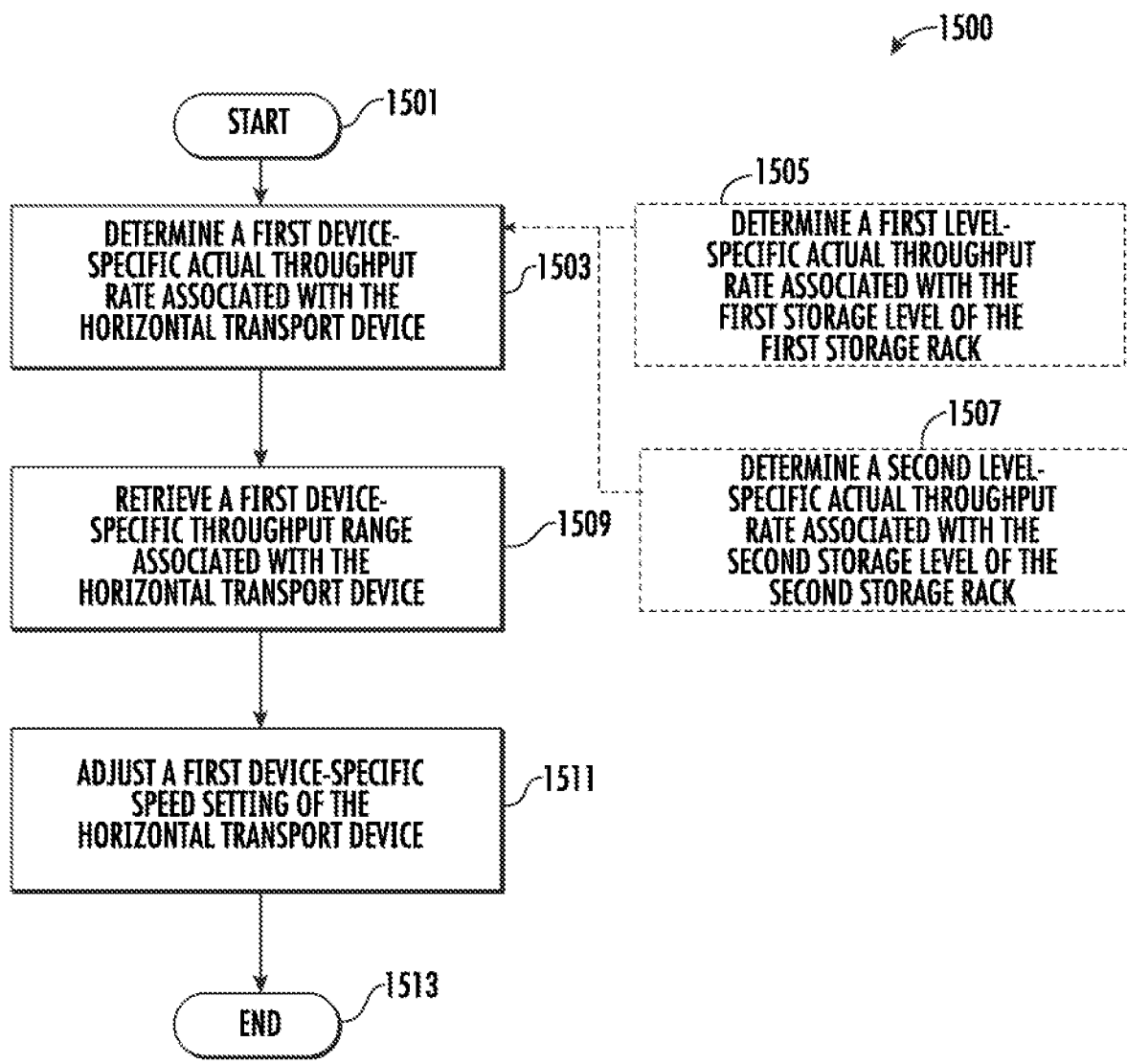
FIG. 15 is an example flow diagram illustrating an example method of adjusting an example device-specific speed setting of an example horizontal transport device in accordance with some example embodiments described herein.

Referring now to FIG. 15, an example method 1500 of adjusting an example device-specific speed setting of an example horizontal transport device in accordance with embodiments of the present disclosure is illustrated. For example, the example method 1500 adjusts the speed setting of the horizontal transport device based on determining the device-specific actual throughput rate associated with the horizontal transport device and determining the device-specific throughput range associated with the horizontal transport device. As such, the example method 1500 overcomes various technical challenges.

As shown in FIG. 15, the example method 1500 starts at step/operation 1501. Subsequent to and/or in response to step/operation 1501, the example method 1500 proceeds to step/operation 1503. At step/operation 1503, a controller device (such as, but not limited to, the WES and/or one of the horizontal transport device controllers described herein in connection with at least FIG. 5 and FIG. 6) determines a first device-specific actual throughput rate associated with the horizontal transport device.

In some embodiments, the first device-specific actual throughput rate may be determined by the horizontal transport device controller associated with the horizontal transport device. For example, the horizontal transport device may comprise one or more sensors for tracking articles, and the horizontal transport device controller may keep track of the number of articles within a time interval, and may determine the device-specific actual throughput rate associated with the horizontal transport device.

While the description above provides an example of using a device controller to determine the device-specific actual throughput rate associated with the horizontal transport device, it is noted that the scope of the present disclosure is not limited to the description above. In some examples, an example method may utilize the WES to determine the device-specific actual throughput rate associated with the horizontal transport device.

As described above, the horizontal transport device assignment data indicates which storage rack(s) and/or which storage level(s) that one horizontal transport device is configured to convey articles to and/or from. As such, in some embodiments, a controller device (such as, but not limited to, the WES and/or one of the horizontal transport device controllers described herein in connection with at least FIG. 5 and FIG. 6) may first retrieve horizontal transport device assignment data, and determine level-specific actual throughput rate(s) of storage level(s) indicated in the horizontal transport device assignment data based on recorded actual throughput rate(s) and/or rack-specific actual throughput rate(s) of storage rack(s) indicated in the horizontal transport device assignment data based on recorded actual throughput rate(s).

For the purpose of illustration in FIG. 15, the horizontal device is associated with a first storage level of a first storage rack and a second storage level of a second storage rack. However, it is noted that the scope of the present disclosure is not limited to this example only.

For example, at step/operation 1505, a controller device (such as, but not limited to, the WES described herein in connection with at least FIG. 5 and FIG. 6) determines a first level-specific actual throughput rate associated with the first storage level of the first storage rack based on recorded actual throughput rate(s).

Continuing from this example, at step/operation 1507, a controller device (such as, but not limited to, the WES described herein in connection with at least FIG. 5 and FIG. 6) determines a second level-specific actual throughput rate associated with the second storage level of the second storage rack based on recorded actual throughput rate(s).

In some embodiments, the controller device calculates a first device-specific actual throughput rate associated with the horizontal transport device based at least in part on the first level-specific actual throughput rate and the second level-specific actual throughput rate. For example, the controller device combines the first level-specific actual throughput rate and the second level-specific actual throughput rate to determine the first device-specific actual throughput rate associated with the horizontal transport device.

Subsequent to and/or in response to step/operation 1503, the example method 1500 proceeds to step/operation 1509. At step/operation 1509, a controller device (such as, but not limited to, the WES and/or one of the horizontal transport device controllers described herein in connection with at least FIG. 5 and FIG. 6) retrieves a first device-specific throughput range associated with the horizontal transport device.

In some embodiments, the device-specific throughput range may indicate a throughput range that is predetermined specifically for the horizontal transport device. In some embodiments, the device-specific throughput range may correspond to a predetermined speed setting, similar to various examples described herein.

Subsequent to and/or in response to step/operation 1509, the example method 1500 proceeds to step/operation 1511. At step/operation 1511, a controller device (such as, but not limited to, the WES and/or one of the horizontal transport device controllers described herein in connection with at least FIG. 5 and FIG. 6) adjusts a first device-specific speed setting of the horizontal transport device.

In some embodiments, the controller device adjusts a first device-specific speed setting of the horizontal transport device based at least in part on the first device-specific actual throughput rate and the first device-specific throughput range (for example, a relationship between the first device-specific actual throughput rate and the first device-specific throughput range). For example, the controller device adjusts the motor speed of the horizontal transport device based on the first device-specific actual throughput rate and the first device-specific throughput range, similar to various examples described herein in connection with at least FIG. 7 to FIG. 9.

Subsequent to and/or in response to step/operation 1511, the example method 1500 proceeds to step/operation 1513 and ends.

Figure 16:
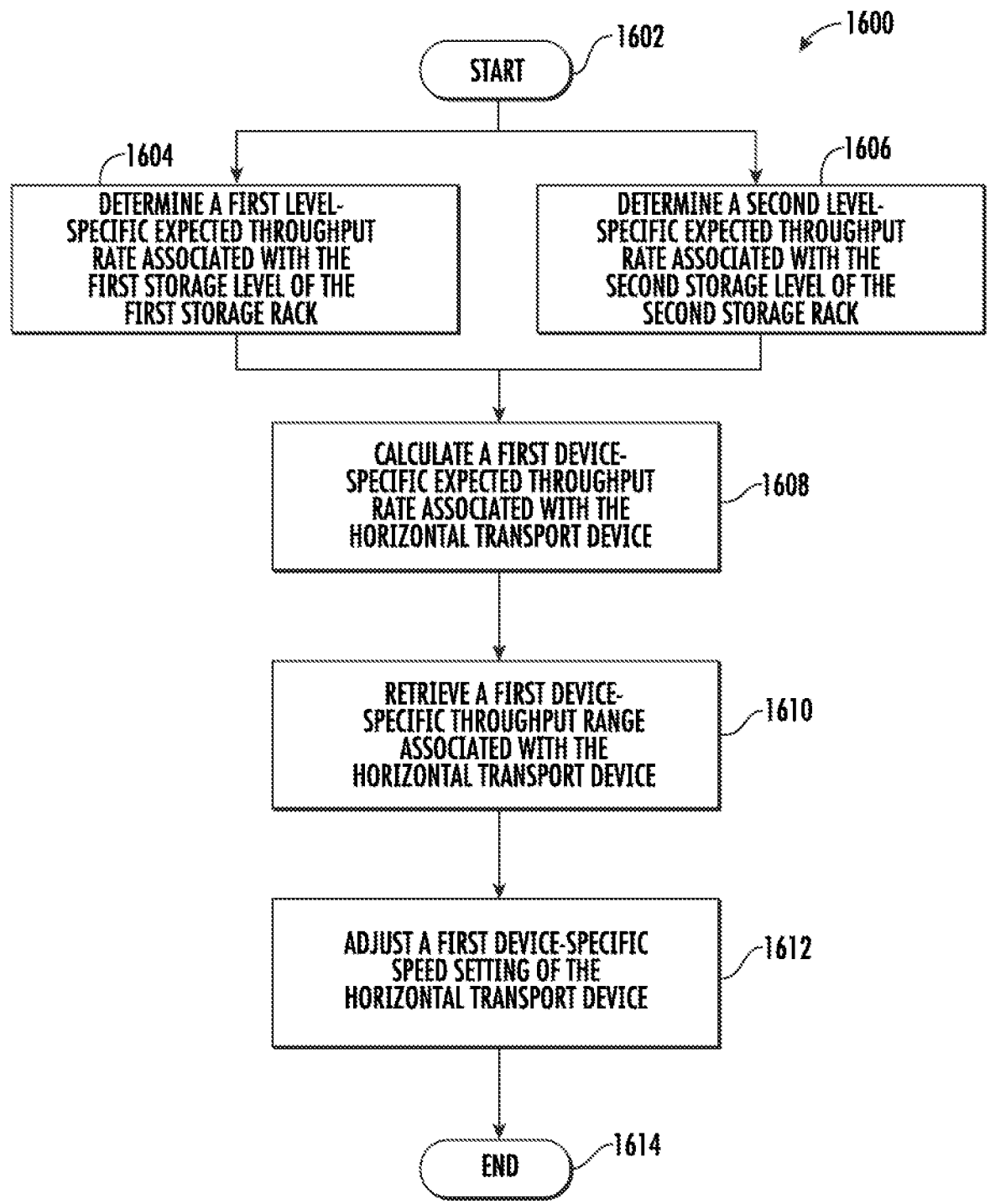
FIG. 16 is an example flow diagram illustrating an example method of adjusting an example device-specific speed setting of an example horizontal transport device in accordance with some example embodiments described herein.

Referring now to FIG. 16, an example method 1600 of adjusting an example device-specific speed setting of an example horizontal transport device in accordance with embodiments of the present disclosure is illustrated. For example, the example method 1600 adjusts the speed setting of the horizontal transport device based on calculating the device-specific expected throughput rate associated with the horizontal transport device and determining the device-specific throughput range associated with the horizontal transport device. As such, the example method 1600 overcomes various technical challenges.

As shown in FIG. 16, the example method 1600 starts at step/operation 1602.

As described above, the horizontal transport device assignment data indicates which storage rack(s) and/or which storage level(s) that one horizontal transport device is configured to convey articles to and/or from. As such, in some embodiments, a controller device (such as, but not limited to, the WES and/or one of the horizontal transport device controllers described herein in connection with at least FIG. 5 and FIG. 6) may first retrieve horizontal transport device assignment data, and determine level-specific expected throughput rate(s) of storage level(s) indicated in the horizontal transport device assignment data and/or rack-specific expected throughput rate(s) of storage rack(s) indicated in the horizontal transport device assignment data.

For the purpose of illustration in FIG. 16, the horizontal device is associated with a first storage level of a first storage rack and a second storage level of a second storage rack. However, it is noted that the scope of the present disclosure is not limited to this example only.

Referring back to FIG. 16, subsequent to and/or in response to step/operation 1602, the example method 1600 proceeds to step/operation 1604. At step/operation 1604, a controller device (such as, but not limited to, the WES described herein in connection with at least FIG. 5 and FIG. 6) determines a first level-specific expected throughput rate associated with the first storage level of the first storage rack.

For example, based on the order fulfillment data (and the inventory tracking data), the controller device determines the articles (and the number of these articles) to be transported to and/or from the first storage level of the first storage rack over a time period. The controller device may divide the amount of articles by the time period to determine the first level-specific expected throughput rate, similar to those described in connection with at least FIG. 10.

Subsequent to and/or in response to step/operation 1602, the example method 1600 proceeds to step/operation 1606. At step/operation 1606, a controller device (such as, but not limited to, the WES described herein in connection with at least FIG. 5 and FIG. 6) determines a second level-specific expected throughput rate associated with the second storage level of the second storage rack.

For example, based on the order fulfillment data (and the inventory tracking data), the controller device determines the articles (and the number of these articles) to be transported to and/or from the second storage level of the second storage rack over a time period. The controller device may divide the amount of articles by the time period to determine the second level-specific expected throughput rate, similar to those described in connection with at least FIG. 10.

Subsequent to and/or in response to step/operation 1604 and/or step/operation 1606, the example method 1600 proceeds to step/operation 1608. At step/operation 1608, a controller device (such as, but not limited to, the WES described herein in connection with at least FIG. 5 and FIG. 6) calculates a first device-specific expected throughput rate associated with the horizontal transport device.

In some embodiments, the controller device calculates the first device-specific expected throughput rate associated with the horizontal transport device based at least in part on the first level-specific expected throughput rate and the second level-specific expected throughput rate. For example, the controller device combines the first level-specific expected throughput rate and the second level-specific expected throughput rate to determine the first device-specific expected throughput rate associated with the horizontal transport device.

Subsequent to and/or in response to step/operation 1608, the example method 1600 proceeds to step/operation 1610. At step/operation 1610, a controller device (such as, but not limited to, the WES described herein in connection with at least FIG. 5 and FIG. 6) retrieves a first device-specific throughput range associated with the horizontal transport device.

In some embodiments, the device-specific throughput range may indicate a throughput range that is predetermined specifically for the horizontal transport device. In some embodiments, the device-specific throughput range may correspond to a predetermined speed setting, similar to various examples described herein.

Subsequent to and/or in response to step/operation 1610, the example method 1600 proceeds to step/operation 1612. At step/operation 1612, a controller device (such as, but not limited to, the WES described herein in connection with at least FIG. 5 and FIG. 6) adjusts a first device-specific speed setting of the horizontal transport device.

In some embodiments, the controller device adjusts the first device-specific speed setting of the horizontal transport device based at least in part on the first device-specific expected throughput rate and the first device-specific throughput range (for example, a relationship between the first device-specific expected throughput rate and the first device-specific throughput range). For example, the controller device adjusts the motor speed of the horizontal transport device based on the first device-specific expected throughput rate and the first device-specific throughput range, similar to various examples described herein in connection with at least FIG. 7 to FIG. 9.

Subsequent to and/or in response to step/operation 1612, the example method 1600 proceeds to step/operation 1614 and ends.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:
retrieve throughput data associated with each of one or more storage levels in an automated storage and retrieval system (ASRS), wherein the throughput data comprises at least one of an expected throughput rate or an actual throughput rate of each of the one or more storage levels;
determine at least one of an expected throughput rate or an actual throughput rate of at least one article transport device in the ASRS based on combination of the retrieved throughput data of each of the one or more storage levels in ASRS;
retrieve at least one throughput range associated with the at least one article transport device in the ASRS, wherein each of the at least one throughput range comprises an upper throughput limit associated with the at least one article transport device in the ASRS and a lower throughput limit associated with the at least one article transport device in the ASRS; and
adjust at least one speed setting of the at least one article transport device of the ASRS based at least in part on the at least one of an expected throughput rate or an actual throughput rate and the at least one throughput range.

2. The apparatus of claim 1, wherein the at least one non-transitory memory and the program code are configured to, with the at least one processor, cause the apparatus to, in response to determining that the determined expected throughput rate or the determined actual throughput rate of the at least one article transport device exceeds the upper throughput limit, increase the at least one speed setting of the at least one article transport device of the ASRS.

3. The apparatus of claim 1, wherein the at least one non-transitory memory and the program code are configured to, with the at least one processor, cause the apparatus to, in response to determining that the determined expected throughput rate or the determined actual throughput rate of the at least one article transport device is below the lower throughput limit, decrease the at least one speed setting of the at least one article transport device of the ASRS.

4. The apparatus of claim 1, wherein the at least one non-transitory memory and the program code are configured to, with the at least one processor, cause the apparatus to:
retrieve a plurality of throughput ranges associated with the at least one article transport device, wherein each of the plurality of throughput ranges is associated with a predetermined speed setting associated with the at least one article transport device of the ASRS;
determine a first throughput range from the plurality of throughput ranges, wherein the expected throughput rate or the actual throughput rate of the at least one article transport device is within the first throughput range;
determine a first predetermined speed setting corresponding to the first throughput range; and
adjust the at least one speed setting of the at least one article transport device based at least in part on the first predetermined speed setting.

5. The apparatus of claim 1, wherein the throughput data comprises the actual throughput rate, wherein the actual throughput rate indicates at least one of an actual article inbound rate or an actual article outbound rate associated with each of the one or more storage levels of the ASRS.

6. The apparatus of claim 1, wherein the throughput data comprises the expected throughput rate, wherein the expected throughput rate indicates at least one of an expected article inbound rate or an expected article outbound rate associated with each of the one or more storage levels of the ASRS.

7. The apparatus of claim 5, wherein the at least one non-transitory memory and the program code are configured to, with the at least one processor, cause the apparatus to:
retrieve, from a warehouse execution system (WES), inventory tracking data and order fulfillment data; and
determine, based at least in part on the inventory tracking data and order fulfillment data, the expected throughput rate.

8. The apparatus of claim 1, wherein the one or more of storage levels are for storing a plurality of articles.

9. The apparatus of claim 8, wherein the at least one article transport device of the ASRS comprises at least one of a vertical transport device, a motor driven roller (MDR) device, and a horizontal transport device.

10. The apparatus of claim 9, wherein the vertical transport device is associated with a first storage level and a second storage level from the one or more storage levels.

11. The apparatus of claim 9, wherein the MDR device is associated with a first storage level from the one or more storage levels.

12. The apparatus of claim 11, wherein the at least one non-transitory memory and the program code are configured to, with the at least one processor, cause the apparatus to:
determine an expected throughput rate or an actual throughput rate of the first storage level;
determine at least one of an expected throughput rate or an actual throughput rate associated with the MDR device based at least in part on the expected throughput rate or the actual throughput rate associated with the first storage level;
retrieve at least one throughput range associated with the MDR device; and
adjust at least one speed setting of the MDR device based at least in part on the at least one throughput range associated with the MDR device.

13. The apparatus of claim 9, wherein the horizontal transport device is associated with a first storage level of and a second storage level of the one or more storage levels.

14. The apparatus of claim 13, wherein the at least one non-transitory memory and the program code are configured to, with the at least one processor, cause the apparatus to:
determine an expected throughput rate or an actual throughput rate of the first storage level and the second storage level;
determine at least one of an expected throughput rate or an actual throughput rate associated with the horizontal transport device based at least in part on the expected throughput rate or the actual throughput rate associated with the first storage level and the second storage level;
retrieve at least one throughput range associated with the horizontal transport device; and
adjust at least one speed setting of the horizontal transport device based at least in part on the at least one throughput range associated with the horizontal transport device.

15. A computer-implemented method comprising:
retrieving throughput data associated with each of one or more storage levels in an automated storage and retrieval system (ASRS), wherein the throughput data comprises at least one of an expected throughput rate or an actual throughput rate of each of the one or more storage levels;
determining at least one of an expected throughput rate or an actual throughput rate of at least one article transport device in the ASRS based on combination of the retrieved throughput data of each of the one or more storage levels in the ASRS;
retrieving at least one throughput range associated with the at least one article transport device in the ASRS, wherein each of the at least one throughput range comprises an upper throughput limit associated with the at least one article transport device in the ASRS and a lower throughput limit associated with the at least one article transport device in the ASRS; and
adjusting at least one speed setting of the at least one article transport device of the ASRS based at least in part on the at least one of an expected throughput rate or an actual throughput rate and the at least one throughput range.

16. The computer-implemented method of claim 15, further comprising, in response to determining that the expected throughput rate or the actual throughput rate exceeds the upper throughput limit, increasing the at least one speed setting of the at least one article transport device of the ASRS.

17. The computer-implemented method of claim 15, further comprising, in response to determining that the expected throughput rate or the actual throughput rate is below the lower throughput limit, decreasing the at least one speed setting of the at least one article transport device of the ASRS.

18. The computer-implemented method of claim 15, further comprising:
retrieving a plurality of throughput ranges associated with the at least one article transport device, wherein each of the plurality of throughput ranges is associated with a predetermined speed setting associated with the at least one article transport device of the ASRS;
determining a first throughput range from the plurality of throughput ranges, wherein the expected throughput rate or the actual throughput rate of at least one article transport device is within the first throughput range;
determining a first predetermined speed setting corresponding to the first throughput range; and
adjusting the at least one speed setting of the at least one article transport device based at least in part on the first predetermined speed setting.

19. A computer program product comprising at least one non-transitory computer-readable storage medium having computer-readable program code portions stored therein, the computer-readable program code portions comprising an executable portion configured to:
retrieve throughput data associated with each of one or more storage levels in an automated storage and retrieval system (ASRS), wherein the throughput data comprises at least one of an expected throughput rate or an actual throughput rate of each of the one or more storage levels;
determine at least one of an expected throughput rate or an actual throughput rate of at least one article transport device in the ASRS based on combination of the retrieved throughput data of each of the one or more storage levels in ASRS;
retrieve at least one throughput range associated with the at least one article transport device in the ASRS, wherein each of the at least one throughput range comprises an upper throughput limit associated with the at least one article transport device in the ASRS and a lower throughput limit associated with the at least one article transport device in the ASRS; and
adjust at least one speed setting of the at least one article transport device of the ASRS based at least in part on the at least one of an expected throughput rate or an actual throughput rate and the at least one throughput range.

* * * * *